US011149153B2

(12) United States Patent
Chu et al.

(10) Patent No.: US 11,149,153 B2
(45) Date of Patent: Oct. 19, 2021

(54) METHOD OF PREPARING A PRODUCT COMPRISING SURFACE MODIFIED SILVER NANOWIRES, AND USE OF THE PRODUCT

(71) Applicant: BASF SE, Ludwigshafen am Rhein (DE)

(72) Inventors: Fangfang Chu, Mannheim (DE); Herve Dietsch, Bad Duerkheim (DE); Thomas Sturm, Schifferstadt (DE); Danny Seyfried, Ludwigshafen (DE)

(73) Assignee: BASF SE

( * ) Notice: Subject to any disclaimer, the term of this patent is extended or adjusted under 35 U.S.C. 154(b) by 39 days.

(21) Appl. No.: 16/091,856

(22) PCT Filed: Apr. 4, 2017

(86) PCT No.: PCT/EP2017/057916
§ 371 (c)(1),
(2) Date: Oct. 5, 2018

(87) PCT Pub. No.: WO2017/174539
PCT Pub. Date: Oct. 12, 2017

(65) Prior Publication Data
US 2019/0085179 A1   Mar. 21, 2019

(30) Foreign Application Priority Data
Apr. 6, 2016 (EP) ..................................... 16163971

(51) Int. Cl.
*C09D 5/00* (2006.01)
*C09D 5/24* (2006.01)
(Continued)

(52) U.S. Cl.
CPC .............. *C09D 5/24* (2013.01); *B22F 1/0022* (2013.01); *B22F 1/0025* (2013.01); *C09D 7/20* (2018.01);
(Continued)

(58) Field of Classification Search
CPC ...................................................... C09D 11/00
See application file for complete search history.

(56) References Cited

U.S. PATENT DOCUMENTS

| 7,922,787 B2 | 4/2011 | Wang et al. |
| 2008/0182090 A1 | 7/2008 | Rouse et al. |
| (Continued) | | |

FOREIGN PATENT DOCUMENTS

| CN | 102015913 A | 4/2011 |
| CN | 103042225 A | 4/2013 |
| (Continued) | | |

OTHER PUBLICATIONS

WO 2015167133A1, Google Patents (Year: 2015).*
(Continued)

*Primary Examiner* — David P Turocy
*Assistant Examiner* — Mohammad Mayy
(74) *Attorney, Agent, or Firm* — Faegre Drinker Biddle & Reath LLP

(57) ABSTRACT

Described is a method of preparing a product comprising an amount of surface modified silver nanowires, the method comprising the following steps: preparing or providing a first surface agent compound having one or more functional groups selected from the group consisting of thiol and amine, for attaching the first surface agent compound to the surface of a silver nanowire, preparing or providing an amount of silver nanowires, attaching said first surface agent compound prepared or provided in step (a) to the surface of said silver nanowires prepared or provided in step (b), so that surface modified silver nanowires result, and optionally (d) adding one or more further constituents and/or conducting one or more further steps so that said product results. Also described are a corresponding product, corresponding uses and a method of coating the surface of an article.

11 Claims, 5 Drawing Sheets

(51) Int. Cl.
  *B22F 1/00* (2006.01)
  *C09D 11/52* (2014.01)
  *C09D 7/20* (2018.01)
  *C09D 7/40* (2018.01)
  *C09D 7/62* (2018.01)
  *C09D 11/033* (2014.01)
  *C09D 11/037* (2014.01)

(52) U.S. Cl.
  CPC ............... *C09D 7/62* (2018.01); *C09D 7/70* (2018.01); *C09D 11/033* (2013.01); *C09D 11/037* (2013.01); *C09D 11/52* (2013.01); *B22F 2301/255* (2013.01); *B22F 2304/05* (2013.01)

(56) References Cited

U.S. PATENT DOCUMENTS

| | | | |
|---|---|---|---|
| 2009/0181172 A1* | 7/2009 | Parpia | B82Y 10/00 427/256 |
| 2009/0282948 A1 | 11/2009 | Xia et al. | |
| 2011/0048923 A1* | 3/2011 | Nelson | C09C 1/043 204/157.43 |
| 2011/0185852 A1 | 8/2011 | Allemand | |
| 2013/0192423 A1 | 8/2013 | Yang et al. | |
| 2013/0247275 A1 | 9/2013 | Javad | |
| 2013/0255444 A1 | 10/2013 | Kawaguchi et al. | |
| 2013/0342221 A1 | 12/2013 | Virkar et al. | |
| 2014/0123808 A1 | 5/2014 | Lynch et al. | |
| 2015/0011763 A1 | 1/2015 | Whitcomb | |
| 2018/0171159 A1* | 6/2018 | Ooi | C09D 7/67 |

FOREIGN PATENT DOCUMENTS

| | | | | |
|---|---|---|---|---|
| CN | 103433503 A | 12/2013 | | |
| WO | WO 2013/191337 A1 | 12/2013 | | |
| WO | WO 2015167133 A1 * | 11/2015 | | |
| WO | WO-2015167133 A1 * | 11/2015 | ............... | B22F 1/02 |
| WO | WO 2016/023887 A1 | 2/2016 | | |

OTHER PUBLICATIONS

WO 2015167133 A1, Google patent (Year: 2015).*
International Search Report dated May 11, 2017, in PCT/EP2017/057916 filed Apr. 4, 2017.
European Search Report dated Sep. 16, 2018, in Europe Patent Application 16163971.1 filed Apr. 6, 2016.
International Preliminary Report on Patentability received for PCT Patent Application No. PCT/EP2017/057916, dated Oct. 18, 2018, 6 pages.

* cited by examiner

⁀ : second surface agent compound    ⁊ : first surface agent compound

METHOD OF PREPARING A PRODUCT COMPRISING SURFACE MODIFIED SILVER NANOWIRES, AND USE OF THE PRODUCT

The invention relates to a method of preparing a product, a corresponding product, the use of a product as a coating material or ink, the use of a compound having one or more functional groups as a surface agent compound for modifying the surface of a silver nanowire, the use of a first surface agent compound having one or more functional groups for exchanging with a second surface agent compound, and the use of a compound as a dispersion enhancer for silver nanowires in a dispersion medium. The invention also relates to a method of coating the surface of an article. The invention is defined in the attached claims, and specific aspects are additionally defined below.

Recently, electrically conductive coatings have been more and more attracting the interest of industry. They are used, for example, to form complex electronic circuitry on printed circuits. Electrically conductive inks are therefore growing in demand and need to be specifically tailored in terms of a variety of application methods and compositions needed to meet the industrial standards.

Electrically conductive inks in use today consist essentially of an organic polymer matrix and, dispersed therein, one or more nanostructured metal particles, metal particle precursors, or other conductive nanostructures. The electrically conductive inks may also contain, usually in low concentration, additives whose role is to maintain or improve their stability (e.g., setting agents) or to precisely control their viscosity to allow a convenient application (e.g., by the use of solvents). The key properties of the printed electronic layer can be affected, e.g., by adjusting the concentration and/or dispersion characteristics of the nanostructured metal particles in the polymer matrix. The electrically conductive inks are usually applied onto the surface of a substrate by using different coating processes (for example screen printing).

In particular, silver nanowires are widely used in display devices, for example in form of transparent conductive layers. Due to the preparation methods used to prepared silver nanowires and in spite of considerable effort in the research community, silver nanowires known in the prior art can hardly be dispersed homogeneously in non-polar or hydrophobic solvents.

It thus remains difficult, e.g., to increase the concentration of the silver nanowires in a matrix or to homogeneously disperse them in a matrix. Such a matrix is, e.g., an electrically conductive ink comprising silver nanowires and one or more organic solvents, specifically hydrophobic solvents, commonly used in different coating processes to make electrically conductive inks.

Different teachings regarding such methods or agents have been reported in the patent literature:

US 2014/0123808 A1 discloses "nanowire preparation methods, compositions, and articles" (title). The article comprises a substrate in combination with a conductive composition.

US 2008/0182090 A1 discloses a composition which is suitable for use as an ink for high speed printing for producing electronic circuitry such as RFID antennas etc., said composition comprising the following constituents
  (a) conductive particles, preferably silver particles, more preferably silver flakes
  (b) styrene/(meth)acrylic copolymer
  (c) an anionic wetting agent
  (d) defoamer and
  (e) water.

US 2013/0342221 A1 discloses "metal nanostructured networks and transparent conductive material" (title). A "precursor ink" (see claim 1) and a "method for forming a transparent conductive film" (see claim 8) are disclosed. Furthermore, a solution is disclosed "for the direct application as a coating with the metal nanowires" (see paragraph [0035]).

US 2013/0192423 A1 discloses a method of producing silver nanowires, comprising embodiments where a sulfhydryl-containing aliphatic compound is added to the later period of the polyol process.

US 2015/0011763 A1 discloses compositions comprising surface functionalized metal nanoparticles and methods for their formation.

It was an object of the present invention to provide a method of preparing a product comprising an amount of surface modified silver nanowires and to provide the corresponding product, wherein said surface modified silver nanowires can be compatibly combined with or are present in contact with specific dispersion media heretofore considered as incompatible.

The method should preferably provide a product comprising a product dispersion medium, in which silver nanowires are homogeneously dispersed, specifically under the production conditions applied in print and electronic industry and/or over extended periods of time.

Preferably, the silver nanowires should be homogeneously dispersible in common organic solvents, particularly in hydrophobic organic solvents.

It was a further object of the present invention to provide for a corresponding use and a method of coating the surface of an article.

The subject-matter of the present invention is defined in the claims. Preferred aspects of the present invention are furthermore defined in the following description, and in the examples stated below.

The primary object of the present invention is achieved by a method of preparing a product comprising an amount of surface modified silver nanowires, the method comprising the following steps:

(a) preparing or providing a first surface agent compound having one or more functional groups selected from the group consisting of thiol and amine, for attaching the first surface agent compound to the surface of a silver nanowire, (b) preparing or providing an amount of silver nanowires, (c) attaching said first surface agent compound prepared or provided in step (a) to the surface of said silver nanowires prepared or provided in step (b), so that surface modified silver nanowires result, and optionally (d) adding one or more further constituents and/or conducting one or more further steps so that said product results.

The term "silver nanowire" is a term used in the art and as such is understood by the skilled person. In the context of the present invention, a silver nanowire preferably is any silver nanoparticle of cylindrical shape having an aspect ratio (the ratio of the height of the cylinder to its diameter) of at least 5, more preferably of at least 10, even more preferably of at least 100, particularly preferably of at least 1000.

In the context of the present invention, a "surface modified silver nanowire" is a silver nanowire having attached to its surface one or more surface agent compounds.

In the context of the present invention, a "surface agent compound" is a compound which can be or is attached to the surface of a silver nanowire, wherein the atoms of the compound or at least the majority of the atoms of the compound are bound by covalent bonds. Thus, a "surface agent compound" may comprise some ionic or metallic bonds as long as the majority of the atoms of the compound are bound by covalent bonds.

Preferably, the attachment of a surface agent compound to the silver nanowire should be of a considerable binding strength. E.g., the attachment is preferably so strong that, if the surface modified silver nanowires having said surface agent compounds attached to their surface are rinsed for a couple of minutes with common solvents as water, ethanol, isopropanol, or acetone, the surface agent compounds remain attached to the rinsed surfaced modified silver nanowire.

Surprisingly, in own experiments it was found that surface agent compounds having, for attaching these surface agent compounds to the surface of a silver nanowire, one or more functional groups selected from the group consisting of thiol and amine can be used to modify the dispersibility of the silver nanowire so that relevant properties of the surface modified silver nanowire, e.g. the ability of the surface modified silver nanowires to be dispersed in a hydrophobic medium, remain unchanged even in different chemical environments, specifically under typical production conditions of the electronics industry.

Without wishing to be bound by any theory, it is presently believed that the thiol and/or amine functional groups assist in firmly attaching the surface agent compound used according to the present invention to the respective surface of the surface modified silver nanowire.

The present invention also relates to a product (preferably obtainable by the method of the present invention) comprising silver nanowires, wherein a first surface agent compound as defined above (i.e., a first surface agent compound having one or more functional groups selected from the group consisting of thiol and amine, for attaching the first surface agent compound to the surface of a silver nanowire) is attached to the surface of said surface modified silver nanowires. Preferably, the first surface agent compound is attached to the surface of said surface modified silver nanowires via one or more of the functional groups selected from the group consisting of thiol and amine of the surface agent compound. More preferably, the first surface agent compound is attached to the surface of said surface modified silver nanowires via a covalent bond between one or more of said functional groups of the surface agent compound and one or more silver atoms of said surface modified silver nanowires. And even more preferably the first surface agent compound is attached to the surface of said surface modified silver nanowires via a (preferably covalent) bond between one or more of the functional groups of the surface agent compound and one or more silver atoms on the 100 crystal face of said surface modified silver nanowires. In some cases, the surface of surface modified silver nanowires is partially or fully covered by silver oxide.

However, in some cases, the surface agent compound is attached to the surface of the surface modified silver nanowire by adsorption.

While attaching the first surface agent compound to the surface of said surface modified silver nanowire the one or more functional groups of the first surface agent selected from the group consisting of thiol and amine can be present in their deprotonated form (e.g. as a thiolate) or their neutral form (i.e., not bearing an anionic or cationic charge as resulting from deprotonation or protonation of the respective group).

In some cases, a method as described above is preferred, wherein in step (a) a first surface agent compound having at least one thiol group and at least one amine group, for attaching the first surface agent compound to the surface of a silver nanowire, is prepared or provided.

For descriptions and theories of the attachment, specifically of the adsorption, of surface agent compounds to silver surfaces see Huang et al. (Langmuir, 12, 1996, 909-912).

Further constituents can also be attached to the silver nanowire and can have an effect on the bonding type of the surface agent compounds having a functional group as defined above.

The method of the present invention (as defined above) preferably is a method,
wherein in step (b) an amount of silver nanowires is prepared or provided, wherein to the surface of said silver nanowires
(i) a second surface agent compound is attached (i.e., the silver nanowires as prepared or provided are surface modified silver nanowires)
or
(ii) no surface agent compound is attached,
wherein the second surface agent compound is different from the first surface agent compound.

In step (b) of the method of the present invention, preparing or providing an amount of surface modified silver nanowires having attached to their surface a second surface agent compound is advantageous since according to own experiments silver nanowires having no surface agent compound attached to their surface are difficult to disperse in common organic solvents and are thus difficult to use in chemical reactions or transformations. As according to the present invention step (b) is conducted before step (c), according to this preferred aspect of the invention the second surface agent compound is attached before the first surface agent compound is attached to the surface of said silver nanowires.

A method of the present invention as described above (preferably, as described above as being preferred) is preferred, wherein in step (b) an amount of silver nanowires is prepared or provided, wherein to the surface of said silver nanowires a second surface agent compound is attached, wherein the second surface agent compound is different from the first surface agent compound.

Attaching a first surface agent compound to the (surface modified) silver nanowire having attached to its surface a second surface agent compound has the effect that the hydrophobicity and thus the dispersibility of the resulting surface modified silver nanowire in a dispersion medium can be tailored according to the requirements of the individual practical situation by precisely adjusting the ratio of the amount of the first surface agent compounds to the amount of the second surface agent compounds, both attached to the surface of the surface modified silver nanowire. Accordingly, the properties of a corresponding electroconductive layer (i.e. an electroconductive layer resulting from the application of a product comprising silver nanowires having attached to their surface an adjusted ratio of two different surface agent compounds) can be tailored according to the requirements of the individual situation.

A method of the present invention as described above (preferably as described above as being preferred) is preferred, wherein in step (b) an amount of silver nanowires is prepared using the polyol process (also known as "polyol method", both terms are used synonymously throughout the present text), wherein to the surface of said amount of silver nanowires a second surface agent compound is attached, wherein the second surface agent compound is different from the first surface agent compound, and wherein the second surface agent compound is preferably a capping agent.

The "polyol method" (polyol process) is a general process for synthesizing silver nanowires. It is described for instance in the following documents: Xia et al., Nano Lett. 2002, 2, 165; Adv. Mater. 2002, 14, 833; Chem. Mater. 2002, 14, 4736.

A "capping agent" is a key reagent in the polyol method. It is a compound which can control or modify the growth of said silver nanowires. Polyvinylpyrrolidone (PVP) is presently the most widely used capping agent. Corresponding patent documents are, e.g., US 2009/0282948 A1, US 2011/0185852 A1, US 2014/0123808 A1, WO 2013/191337 A1, CN 103433503 A. In the context of the present invention "capping agent" refers to a chemical agent which, in a polyol process, directs the growth of a silver nanoparticle so that a silver nanowire results. Typically, a capping agent to a certain amount is attached to the surface of the silver nanowire produced, and it typically takes specific measures to remove the capping agent from said surface. According to the above definition, a silver nanowire having a capping agent attached to its surface is considered a surface modified silver nanowire, and the capping agent is considered a surface agent compound.

Further literature on the polyol method for producing silver nanowires:

US 2012/0247275 A1 discloses a process for forming monodispersed silver nanowires, wherein a polyol is utilized. A capping agent is mixed in the polyol to form a substantially homogeneous solution. Polyvinylpyrrolidone (PVP) is disclosed as a capping agent.

US 7922787 B2 discloses "Methods for the production of silver nanowires" (title). PVP is disclosed as an "organic protective agent".

US 2009/0282948 A1 discloses "Methods of nanostructure formation and shape selection" (title).

US 2011/0185852 A1 discloses "Methods of controlling nanostructure formations and shapes".

US 2013/0255444 A1 discloses a "Process for producing silver nanowires and agent for controlling growth of silver nanowires" (title).

WO 2013/191337 A1 discloses a "production method for silver nanowire" (title).

Without wishing to limit the number of preparation processes for silver nanowires used in the present invention, it is advantageous to prepare surface modified silver nanowires in step (b) by using the polyol process since the surface modified silver nanowires produced by the polyol process have a capping agent attached to the surface which is a second surface agent compound as described above. The polyol process provides surface modified silver nanowires which are conveniently dispersed in a limited number of dispersion media as, for example, ethanol or water and can thus be employed in chemical reactions or transformation, e.g. wherein a first surface agent compound is attached to the surface of the surface modified silver nanowires (step (c) of the process of the invention).

A method as described above (preferably as described above as being preferred) is preferred, wherein the second surface agent compound is selected from the group consisting of polyvinylpyrrolidone (PVP), polyethylene oxide (PEO) and polymers containing imidazolidon-1-yl units.

A particularly preferred second surface agent compound is polyvinylpyrrolidone (PVP).

These specific second surface agent compounds are known to be typical capping agents used in the polyol process. Corresponding surface modified silver nanowires can conveniently be dispersed in a limited number of dispersion media as described above, for example in ethanol or water.

Polymers containing imidazolidon-1-yl units which are suitable as second surface agents are, for example,

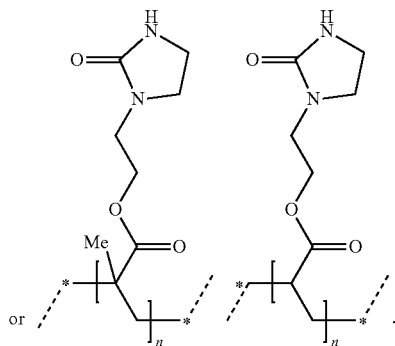

A method of the present invention as described above (preferably as described above as being preferred) is preferred, wherein in step (c) said second surface agent (e.g. a capping agent) compound is partially or completely removed from the surface of said silver nanowires prepared or provided in step (b), preferably by exchanging said second surface agent compound by said first surface agent compound.

Typically, in step (c) first surface agent compounds having one or more functional groups selected from the group consisting of thiol or amine are firmly attached to the surface of the silver nanowire so that a second surface agent compound attached to the surface of said surface modified silver nanowire after step (b) is desorbed from the surface of said surface modified silver nanowire. In preferred aspects, second surface agent compounds which are removed in step (c) by said first surface agent compounds are capping agents as discussed above, e.g. polyvinylpyrrolidone (PVP), polyethylene oxide (PEO) and polymers containing imidazolidone-1-yl units.

Without wishing to be bound to any theory, it is presently believed that the strength or the number of bonds between the surface of a surface modified silver nanowire and a functional group of a first surface agent compound as defined above is increased compared to the strength or the number of bonds between the surface of a silver nanowire and typical capping agents present as a second surface agent, for example, a pyrrolidone unit of polyvinylpyrrolidone. Own experiments show that surface modified silver nanowires having attached to their surface first surface agent compounds having one or more functional groups selected from the group consisting of thiol and amine, for attaching the first surface agent compound to the surface of said surface modified silver nanowire, are more stable in different chemical environments than surface modified silver nanowires having attached to their surface typical second surface agent compounds (in particular, capping agents) as described above.

A method of the present invention as described above (preferably, as described above as being preferred) is preferred, wherein
in step (c) said second surface agent (e.g. a capping agent) compound is partially or completely removed from the surface of said silver nanowires prepared or provided in step (b) by exchanging in a dispersion medium said second surface agent compound by said first surface agent compound, so that
(i) surface modified silver nanowires having attached to their surface said first surface agent compounds result
and
(ii) at least a fraction of said second surface agent compound is dissolved or dispersed in said dispersion medium,
and subsequently
said surface modified silver nanowires having attached to their surface said first surface agent compounds are separated from at least said fraction of said second surface agent compound being dissolved or dispersed in said dispersion medium, preferably by separating said surface modified silver nanowires having attached to their surface said first surface agent compounds from the dispersion medium having dissolved or dispersed therein at least a fraction of said second surface agent compound.

A method of the present invention as described above (preferably as described above as being preferred) is preferred, wherein said resulting product comprises an amount of surface modified silver nanowires dispersed in a product dispersion medium.

Herein, a "product dispersion medium" is the continuous phase of a product of the preferred method of the present invention, wherein the product is a dispersion and comprises surface modified silver nanowires dispersed in the continuous phase. Thus, the product dispersion comprises surface modified silver nanowires as a non-continuous phase. A product dispersion medium can consist of an additive dispersion medium or of a mixture of an additive dispersion medium and an intermediate dispersion medium as defined hereinbelow.

Preferred product dispersion media comprise one or more organic solvents selected from the group consisting of alcohols, ethers (e.g., glycol ethers), esters, ketones and hydro-carbons (e.g., aromatic hydrocarbons).

Particularly preferred product dispersion media comprise one or more organic solvents selected from the group consisting of 2-propanol, toluene, dipropylene glycol methyl ether acetate, acetone, butyl acetate, butanone, ethanol, 2-butanol, and tetrahydrofuran.

Depending on the respective product dispersion medium selected, the skilled person can identify the most appropriate first surface agent compound in order to arrive at a maximum stability of the dispersion product, i.e. the surface modified silver nanowires remain homogeneously dispersed over a long period of time, e.g. days and weeks.

Surprisingly, it has been found that surface agent compounds having one or more functional groups selected from the group consisting of thiol or amine can be firmly attached to the surface of a silver nanowire, and, as a consequence, can change the surface property of the silver nanowire, for example, in such a way that the surface modified silver nanowires can be homogeneously and permanently dispersed in a variety of organic solvents.

Surface modified silver nanowires as prepared according to method of the present invention correspondingly have the advantage that they can be homogeneously dispersed in a wide range of dispersion media.

A method as described above (preferably as described above as being preferred) is preferred, wherein
in step (b) an amount of silver nanowires is prepared or provided which is dispersed in an intermediate dispersion medium
and
in one or more further steps after step (b) and before, in or after step (c) said intermediate dispersion medium is partially or completely exchanged against an additive dispersion medium which is different from the intermediate dispersion medium.

An "intermediate dispersion medium" is the continuous phase of an intermediate dispersion comprising silver nanowires (preferably surface modified silver nanowires), e.g. as prepared or provided in step (b) of a preferred method of the invention. The intermediate dispersion comprises silver nanowires as a non-continuous phase and is preferably an intermediate product as resulting from the polyol process (in this case the silver nanowires are surface modified).

In many cases the surface modified silver nanowires resulting from step (c) (i.e., silver nanowires having a first surface agent compound attached to their surface) are not perfectly compatible with the intermediate dispersion medium present after step (b), or the intermediate dispersion medium does not meet the requirements of the future use of the dispersion in industrial processes. In particular in such cases the partial or complete exchange of the intermediate dispersion medium is preferred. Preferably, the additive dispersion medium is selected such that the compatibility is improved (i.e. the surface modified silver nanowires resulting from step (c) are compatible with the additive dispersion medium or the additive dispersion medium/intermediate dispersion medium mixture) and/or the additive dispersion medium is selected in order to meet the requirements of the future use of the dispersion in industrial processes.

According to this aspect of the invention, particularly preferred is a method of the present invention as described above (preferably as described above as being preferred), wherein in step (b) an amount of silver nanowires is prepared or provided which is dispersed in an intermediate dispersion medium, wherein to the surface of said silver nanowires resulting from step (b) a second surface agent compound is attached (see above), and wherein in step (c), said second surface agent compound is exchanged by a first surface agent compound, said first surface agent compound having one or more functional groups for attaching the first surface agent compound to the surface of the silver nanowire, at least one functional group of the first surface agent compound being selected from the group consisting of thiol and amine, and
subsequently
in a step (c-1), the intermediate dispersion medium is exchanged (partially or completely) by an additive dispersion medium different from the intermediate dispersion medium.

A method of the present invention as described above (preferably, as described above as being preferred) is preferred, wherein
in step (b) an amount of silver nanowires is prepared or provided which is dispersed in an intermediate dispersion medium
and
in one or more further steps after step (c) said intermediate dispersion medium is partially or completely exchanged against an additive dispersion medium which is different from the intermediate dispersion medium.

A method of the present invention as described above (preferably, as described above as being preferred) is preferred, wherein in step (b) an amount of silver nanowires is prepared or provided which is dispersed in an intermediate dispersion medium, wherein to the surface of said silver nanowires a second surface agent compound is attached, wherein the second surface agent compound is different from the first surface agent compound, wherein in step (c) said second surface agent compound is partially or completely removed from the surface of said silver nanowires prepared or provided in step (b), preferably by exchanging said second surface agent compound by said first surface agent compound, and wherein, in one or more further steps after step (c), said intermediate dispersion medium is partially or completely exchanged against an additive dispersion medium which is different from the intermediate dispersion medium.

When exchanging the intermediate dispersion medium the skilled person will consider the compatibility of the surface agent compound on the silver nanowires with the additive dispersion medium or with the mixtures of the intermediate dispersion medium and the additive dispersion medium.

A method of the present invention as described above (preferably, as described above as being preferred) is preferred, wherein in step (b) an amount of silver nanowires is prepared or provided which is dispersed in an intermediate dispersion medium in a concentration in the range of from 0.001 wt.-% to 2 wt.-%, based on the total amount of the intermediate dispersion, wherein the intermediate dispersion has a homogeneity index of at least 80%, and/or the resulting product is a product dispersion which comprises an amount of surface modified silver nanowires dispersed in a product dispersion medium in a concentration in the range of from 0.001 wt.-% to 2 wt.-%, based on the total amount of the product dispersion, wherein the product dispersion has a homogeneity index of at least 80%.

The determination method for the homogeneity index is defined below. Product dispersions or intermediate dispersions having a homogeneity index of at least 80% do not comprise a significant amount of agglomerates or aggregates of silver nanowires and are thus easily processed to a film wherein the silver nanowires are homogeneously distributed.

A method of the present invention as described above (preferably, as described above as being preferred) is preferred, wherein said intermediate dispersion medium and/or additive dispersion medium has a boiling point >30° C. at 1013 hPa, preferably a boiling point >120° C. at 1013 hPa.

During the coating of a product as described above (or as described above as preferred) onto a surface of an article (see the method according to the present invention of coating the surface of an article, as discussed below), typically the dispersion medium should not completely vaporize. Therefore, it is advantageous to employ intermediate and/or additive dispersion media having a boiling point over 30° C. at 1013 hPa. If higher temperatures are applied in a coating process using a product of the method of the present invention (or as described above as being preferred) it is advantageous to use a dispersion comprising an or additive dispersion medium or comprising a mixture of an intermediate dispersion medium and additive dispersion medium with a boiling point higher than 120° C. at 1013 hPa in the coating process.

A method of the present invention as described above (preferably, as described above as being preferred) is preferred, wherein said intermediate dispersion medium comprises one or more compounds selected from the group consisting of water,
acetone,
methanol,
ethanol,
propan-1-ol,
propan-2-ol,
1-hydroxybutan,
2-hydroxybutan,
1-hydroxy-2-methylpropan,
2-hydroxy-2-methylpropan,
formic acid,
acetic acid,
propionic acid,
and
aniline.

These specific intermediate dispersion media and corresponding compounds are conveniently used in a variety of synthesis methods for the preparation of silver nanowires.

A method of the present invention as described above (preferably, as described above as being preferred), more preferably according to the method, wherein the specific intermediate dispersion media as described above are used, is preferred, wherein said additive dispersion medium comprises one or more compounds selected from the group consisting of substituted or unsubstituted, branched or linear, and aliphatic or aromatic organic compounds having a total number of carbon atoms of at least 2 carbon atoms, preferably at least 4 carbon atoms, including substituents.

Preferred substituents of substituted organic compounds as described hereinabove or hereinbelow are typical functional groups selected from the group consisting of:

—OH (hydroxy-substituent resulting in an alcohol),
=O (oxo-substituent resulting in a ketone or an aldehyde),
—O— (oxa-substituent resulting in an ether),
—C(=O)OH (carboxylic substituent resulting in a carboxylic acid),
—F (fluoro-substituent),
—Cl (chloro-substituent),
—Br (bromo-substituent),
—I (iodo-substituent),
and
—NH$_2$ (amino-substituent).

In many cases, it is preferred to have several substituents on the same organic compound, e.g. an oxo-substituent and a oxa-substituent in neighbouring positions resulting in the corresponding ester, e.g. ethyl acetate, CH$_3$CH$_2$—C(=O)—O—CH$_2$CH$_3$, ethyl lactate, or butyl hydroxyacetate.

A method of the present invention as described above (preferably, as described above as being preferred) is preferred, wherein said additive dispersion medium comprises one or more compounds selected from the group consisting of substituted or unsubstituted, branched or linear, and aliphatic or aromatic organic compounds having a total number of carbon atoms of at least 2 carbon atoms, preferably at least 4 carbon atoms, including substituents, and preferably comprises one or more compounds selected from the group consisting of alcohols, ethers, esters, ketones and aromatic organic compounds.

Examples of suitable alcohols as described above are 1-hydroxypentane, 2-hydroxypentane, 1-hydroxy-2-methyl-pentan, and 2-hydroxy-2-methylpentan.

Examples of suitable ethers as described above are diethyl ether, tetrahydrofuran, and diisopropyl ether.

Examples of suitable esters as described above are dipropylene glycol methyl ether acetate, ethyl acetate, butyl acetate, ethyl lactate, and butyl hydroxyacetate.

Examples of suitable ketones as described above are 2-butanone, 2-pentanone, 2-haxanone and isophorone.

Examples of suitable aromatic organic compounds as described above preferably are aromatic hydrocarbons, e.g. toluene, xylene, and ethylbenzene.

A method of the present invention as described above (preferably, as described above as being preferred) is preferred, wherein the ratio of the total weight of surface agent compounds attached to the surface of said surface modified silver nanowires to the total weight of said surface modified silver nanowires is in the range of from 0.01 to 0.3 and is determined by thermogravimetry.

A method of the present invention as described above (preferably, as described above as being preferred) is preferred, wherein said first surface agent compound prepared or provided in step (a) having one or more functional groups is selected from the group consisting of compounds of formula (I)

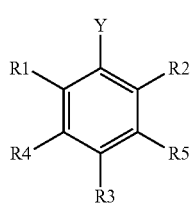

formula (I)

wherein

Y is SH or $NH_2$, and

R1, R2, R3, R4 and R5 independently of each other are hydrogen, an alkyl radical having a total number of carbon atoms of from 1 to 10 carbon atoms, or an alkenyl radical having a total number of carbon atoms of from 2 to 10 carbon atoms.

and compounds of formula (II)

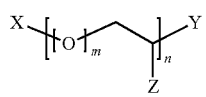

formula (II)

wherein

Y is SH or $NH_2$,

X is hydrogen, methyl (—$CH_3$), ethyl (—$CH_2$—$CH_3$), aminomethyl (—$CH_2$—$NH_2$) or 2-aminoethyl (—$CH_2$—$CH_2$—$NH_2$), each Z is independently of the meaning of any other Z hydrogen, methyl, ethyl or a hydroxy group, m is 0 or 1 and n is an integer in the range of from 0 to 300, preferably in the range of from 1 to 200, more preferably in the range of from 50 to 150.

A method of the present invention as described above (preferably, as described above as being preferred) is preferred, wherein said first surface agent compound prepared or provided in step (a) having one or more functional groups is selected from the group consisting of compounds of formula (I)

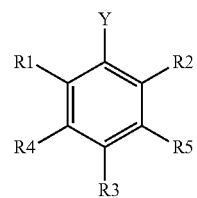

formula (I)

wherein

Y is SH or $NH_2$, and

R1, R2, R3, R4 and R5 independently of each other are hydrogen, an alkyl radical having a total number of carbon atoms of from 1 to 4 carbon atoms, or an alkenyl radical having a total number of carbon atoms of from 2 to 4 carbon atoms.

and compounds of formula (II)

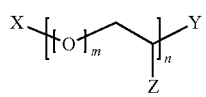

formula (II)

wherein

Y is SH or $NH_2$,

X is hydrogen, methyl (—$CH_3$), ethyl (—$CH_2$—$CH_3$), aminomethyl (—$CH_2$—$NH_2$) or 2-aminoethyl (—$CH_2$—$CH_2$—$NH_2$), each Z is independently of the meaning of any other Z hydrogen or methyl, m is 1 and n is an integer in the range of from 0 to 300, preferably in the range of from 1 to 200, more preferably in the range of from 50 to 150.

A method of the present invention as described above (preferably, as described above as being preferred) is preferred, wherein said first surface agent compound prepared or provided in step (a) having one or more functional groups is selected from the group consisting of compounds of formula (I)

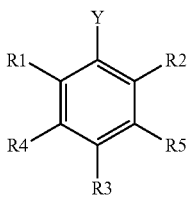

formula (I)

wherein

Y is SH, and

R1, R2, R3, R4 and R5 independently of each other are
  hydrogen,
  an alkyl radical having a total number of carbon atoms of from 1 to 4 carbon atoms,
  or
  an alkenyl radical having a total number of carbon atoms of from 2 to 4 carbon atoms.

and compounds of formula (II)

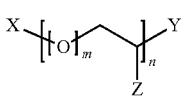

formula (II)

wherein

Y is SH,

X is hydrogen, methyl (—CH$_3$) or ethyl (—CH$_2$—CH$_3$), each Z is independently of the meaning of any other Z hydrogen, methyl or a hydroxy group, m is 0 or 1 and n is an integer in the range of from 0 to 300, preferably in the range of from 1 to 200, more preferably in the range of from 5 to 150.

A method of the present invention as described above (preferably, as described above as being preferred) is preferred, wherein said first surface agent compound prepared or provided in step (a) having one or more functional groups is selected from the group consisting of compounds of formula (I)

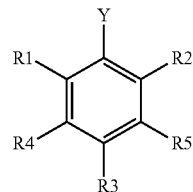

formula (I)

wherein

Y is SH, and

R1, R2, R3, R4 and R5 independently of each other are
  hydrogen,
  methyl,
  or
  an alkenyl radical having a total number of carbon atoms of from 2 to 4 carbon atoms.

and compounds of formula (II)

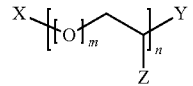

formula (II)

wherein

Y is SH,

X is hydrogen, methyl (—CH$_3$) or ethyl (—CH$_2$—CH$_3$), each Z is independently of the meaning of any other Z hydrogen, methyl or a hydroxy group, m is 0 and n is an integer in the range of from 0 to 300, preferably in the range of from 1 to 200, more preferably in the range of from 5 to 50.

A method of the present invention as described above (preferably, as described above as being preferred) is preferred, wherein said first surface agent compound prepared or provided in step (a) is selected from the group consisting of poly(ethylene glycol) methyl ether thiol (PEGT), 4-methylbenzenethiol, 1-dodecanethiol, hexadecylamine and polyetheramine.

A particularly preferred first surface agent compound is poly(ethylene glycol) methyl ether thiol (PEGT).

In the context of the present invention, the term "poly(ethylene glycol) methyl ether thiol" corresponds to a polymer having a weight average molecular weight in the range of from 500 g/mol to 20000 g/mol and the structure of formula (II-a)

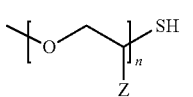

formula (II-a)

wherein
each Z is independently of the meaning of any other Z hydrogen, methyl, ethyl or a hydroxy group,
and
n is an integer in the range of from 0 to 300, preferably in the range of from 1 to 200, more preferably in the range of from 50 to 150.

In the context of the present invention, the term "polyetheramine" corresponds to a polymer having a weight average molecular weight in the range of from 500 g/mol to 20000 g/mol and the structure of formula (II-b)

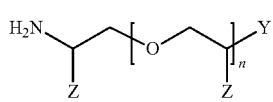

formula (II-b)

wherein
Y is NH$_2$, methyl, ethyl or propyl,
each Z is independently of the meaning of any other Z hydrogen, methyl, ethyl or a hydroxy group,
and
n is an integer in the range of from 0 to 300, preferably in the range of from 1 to 200, more preferably in the range of from 50 to 150.

In particular, a method as described above is preferred, wherein said first surface agent compound prepared or provided in step (a) is selected from the group consisting of poly(ethylene glycol) methyl ether thiol (PEGT),
and
wherein said additive dispersion medium comprises one or more compounds selected from the group consisting of
butyl acetate,
aceton,
toluene,
water,
ethanol,
2-propanol,
dipropylene glycol methyl ether acetate,
ethylene glycol methyl ether,
and
propylene glycol methyl ether.

A method of the present invention as described above (preferably, as described above as being preferred) is preferred, wherein said first surface agent compound prepared or provided in step (a) is selected from the group consisting of poly(ethylene glycol) methyl ether thiol (PEGT) and polyetheramine, wherein said first surface agent compound has a weight average molecular weight in the range of from 500 to 500000 g/mol, preferably in the range of from 200 to 100000 g/mol, more preferably in the range of from 500 to 20000 g/mol.

A method of the present invention as described above (preferably, as described above as being preferred)) is preferred, wherein said at least one functional group of the first surface agent compound prepared or provided in step (a) is thiol,
wherein preferably the surface modified silver nanowires resulting in step (c) are characterized by a bond causing an IR signal at 1372 cm$^{-1}$.

TABLE 1a

Sketches of typical bond types between the AgNW (i.e. the surface modified silver nanowire) and the functional groups of typical surface agent compound and the predicted positions of the corresponding spectroscopic signals.

| sketch of bond between the AgNWs and the functional groups of typical surface agent compound | type of bond to the silver nanowire | predicted position of the spectroscopic signal |
|---|---|---|
| AgNW: —S— | covalent bond | 1372 cm$^{-1}$ (IR signal) |
| —NH$_2$ ⋯ AgNW | dative bond | 1575 cm$^{-1}$ (SERS signal) |

A method of the present invention as described above (preferably, as described above as being preferred)is preferred, wherein the concentration of said surface modified silver nanowires resulting in step (c) is in the range of from 0.5 g/L to 20 g/L, based on the total volume of the product.

A method of the present invention as described above (preferably, as described above as being preferred)is preferred, wherein in step (d) one or more further constituents are added, selected from the group consisting of
binders,
resins,
plasticizers,
anti-foamers,
corrosion inhibitors,
extenders,
surfactants,
and
surface agent compounds having one or more functional groups, at least one functional group of the surface agent compound being selected from the group consisting of thiol and amine, not attached to the surface of a silver nanowire.

Examples of typical binders as described above are
poly(methyl methacrylate) with a weight averaged molecular weight ranging from 2000 to 20,000.
mercaptopoly(ethylene glycol) carboxylic acid with a weight averaged molecular weight ranging from 1000 to 5000,
and
polyvinyl alcohol with a weight averaged molecular weight ranging from 1,000 to 100, 000.

The addition of further constituents as described above has the advantage to further improve the properties of the resulting product and therefore to advantageously adjust the resulting product according to the desired function.

The invention also relates to a product
(a) comprising
an amount of surface modified silver nanowires, wherein each of said surface modified silver nanowires can be prepared by attaching
to the surface of a silver nanowire
a first surface agent compound having one or more functional groups for attaching the first surface agent compound to the surface of the silver nanowire, at least one functional group of the first surface agent compound being selected from the group consisting of thiol and amine,
and optionally
one or more further constituents
and/or
(b) obtained or obtainable by a method as described above (or as described above as preferred).

Generally, all aspects of the present invention discussed herein above in the context of a method of preparing a product apply mutatis mutandis to a according to the invention, if not stated otherwise. And likewise, all aspects of a product according to the invention discussed herein below apply mutatis mutandis to a method of preparing a product according to the invention, if not stated otherwise.

The product of the present invention (as defined above) preferably is a product, wherein
the ratio of the total weight of surface agent compounds attached to the surface of said surface modified silver nanowires to the total weight of said surface modified silver nanowires is in the range of from 0.01 to 0.3 and is determined by thermogravimetry.

A product of the present invention as described above (preferably, as described above as being preferred) is preferred, wherein said first surface agent compound prepared or provided in step (a) having one or more functional groups is selected from the group consisting of
compounds of formula (I)

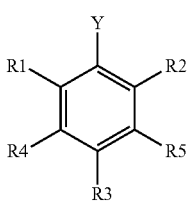

formula (I)

wherein
Y is SH or $NH_2$,
and
R1, R2, R3, R4 and R5 independently of each other are
hydrogen,
an alkyl radical having a total number of carbon atoms of from 1 to 10 carbon atoms,
or
an alkenyl radical having a total number of carbon atoms of from 2 to 10 carbon atoms.
and
compounds of formula (II)

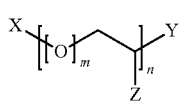

formula (II)

wherein
Y is SH or $NH_2$,
X is hydrogen, methyl (—$CH_3$), ethyl (—$CH_2$—$CH_3$), aminomethyl (—$CH_2$—$NH_2$) or 2-aminoethyl (—$CH_2$—$CH_2$—$NH_2$),
each Z is independently of the meaning of any other Z hydrogen, methyl, ethyl or a hydroxy group,
m is 0 or 1
and
n is an integer in the range of from 0 to 300, preferably in the range of from 1 to 200, more preferably in the range of from 50 to 150.

A product of the present invention as described above (preferably, as described above as being preferred) is preferred, wherein said surface agent compound is selected from the group consisting of poly(ethylene glycol) methyl ether thiol (PEGT), 1-dodecanethiol, 4-methylbenzenethiol, hexadecylamine and polyetheramine.

A product of the present invention as described above (preferably, as described above as being preferred) is preferred, wherein said first surface agent compound prepared or provided in step (a) is selected from the group consisting of poly(ethylene glycol) methyl ether thiol (PEGT) and polyetheramine, wherein said first surface agent compound has a weight average molecular weight in the range of from 500 to 500000 g/mol, preferably in the range of from 200 to 100000 g/mol, more preferably in the range of from 500 to 20000 g/mol.

A product of the present invention as described above (preferably, as described above as being preferred) is preferred, wherein said at least one functional group of the first surface agent compound prepared or provided in step (a) is thiol,
wherein preferably the surface modified silver nanowires resulting in step (c) are characterized by a bond causing an IR signal at 1372 $cm^{-1}$.

A preferred product is a product of the present invention as described above (preferably, as described above as being preferred), comprising as a further constituent a product dispersion medium,
wherein the product is a product dispersion which comprises an amount of surface modified silver nanowires dispersed in the product dispersion medium, wherein the product has a homogeneity index of at least 80%, wherein the concentration of the surface modified silver nanowires in the product dispersion preferably is in the range of from 0.001 wt.-% to 2 wt.-%, based on the total amount of the product dispersion.

A product of the present invention as described above (preferably, as described above as being preferred) is preferred, wherein said product dispersion medium has a boiling point >30° C. at 1013 hPa, preferably a boiling point >120° C. at 1013 hPa.

A product of the present invention as described above (preferably, as described above as being preferred) is preferred, wherein said product dispersion medium comprises one or more compound selected from the group consisting of
water,
substituted or unsubstituted, branched or linear, and aliphatic or aromatic organic compounds,
and
mixtures thereof.

A product of the present invention as described above (preferably, as described above as being preferred) is preferred, wherein said substituted or unsubstituted, branched or linear, and aliphatic or aromatic organic compound is selected from the group consisting of
alcohols,
ethers,
esters,
ketones,
and
aromatic organic compounds.

Examples of suitable alcohols are 1-hydroxybutan, 2-hydroxybutan, 1-hydroxy-2-methylpropan, and 2-hydroxy-2-methylpropan.

Examples of suitable ethers are diethyl ether, tetrahydrofuran, and diisopropyl ether.

Examples of suitable esters are ethyl acetate, butyl acetate, ethyl lactate, and butyl hydroxyl acetate.

Examples of suitable ketones are butanone, 2-pentanone, 2-hexanone and isophorone.

Examples of such aromatic organic compounds are toluene, xylene, and ethylbenzene.

A product of the present invention as described above (preferably, as described above as being preferred) is preferred, wherein the concentration of said surface modified silver nanowires is in the range of from 0.5 g/L to 20 g/L, based on the total volume of the product.

A product of the present invention as described above (preferably, as described above as being preferred) is preferred, comprising one or more further constituents selected from the group consisting of
- binders,
- resins,
- plasticizers,
- anti-foamers,
- corrosion inhibitors,
- extenders,
- surfactants, and
- surface agent compounds having one or more functional groups, at least one functional group of the surface agent compound being selected from the group consisting of thiol and amine, not attached to the surface of a silver nanowire.

The invention also relates to a product comprising
an amount of surface modified silver nanowires, each of
    said surface modified silver nanowires comprising
    a silver nanowire and, attached to its surface,
        a first surface agent compound having one or more functional groups for attaching the first surface agent compound to the surface of the silver nanowire, at least one functional group of the first surface agent compound being selected from the group consisting of thiol and amine,
    and optionally
    further constituents.
wherein the surface agent compound is preferably attached to the surface of the silver nanowire by a bond causing an IR signal at 1372 cm$^{-1}$.

Generally, all aspects of the present invention discussed herein above in the context of
a method of preparing a product
apply mutatis mutandis to a product comprising
an amount of surface modified silver nanowires, each of
    said surface modified silver nanowires comprising
    a silver nanowire and, attached to its surface,
        a first surface agent compound having one or more functional groups for attaching the first surface agent compound to the surface of the silver nanowire
as described above, if not stated otherwise.

Generally, all aspects of the present invention discussed herein above in the context of
a method of preparing a product
apply mutatis mutandis to a use of
a product as described above as a coating material or ink,
a compound having one or more functional groups, at least one functional group of the compound being selected from the group consisting of thiol and amine, as a surface agent compound for modifying the surface of a silver nanowire,
a first surface agent compound having one or more functional groups, at least one functional group of the compound being selected from the group consisting of thiol and amine, for exchanging with a second surface agent compound which is different from the first surface agent compound and is attached to the surface of a silver nanowire,
and
a compound having one or more functional groups, at least one functional group of the compound being selected from the group consisting of thiol and amine, as a dispersion enhancer for silver nanowires in a dispersion medium,
as described hereinbelow.

The invention also relates to a product, comprising an amount of surface modified silver nanowires dispersed in a product dispersion medium,
wherein at least a part of said surface modified silver nanowires, preferably each of said surface modified silver nanowires, has attached to its surface a first surface agent compound having one or more functional groups for attaching the first surface agent compound to the surface of the silver nanowire(s),
wherein said first surface agent compound having one or more functional groups is selected from the group consisting of
compounds of formula (I)

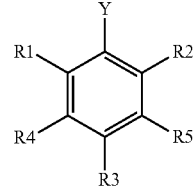

formula (I)

wherein
Y is SH or NH$_2$,
and
R1, R2, R3, R4 and R5 independently of each other are
    hydrogen,
    an alkyl radical having a total number of carbon atoms of from 1 to 10 carbon atoms,
    or
    an alkenyl radical having a total number of carbon atoms of from 2 to 10 carbon atoms.
and
compounds of formula (II)

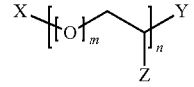

formula (II)

wherein
Y is SH or NH$_2$,
X is hydrogen, methyl (—CH$_3$), ethyl (—CH$_2$—CH$_3$), aminomethyl (—CH$_2$—NH$_2$) or 2-aminoethyl (—CH$_2$—CH$_2$—NH$_2$), each Z is independently of the meaning of any other Z hydrogen, methyl, ethyl or a hydroxy group,
m is 0 or 1
and
n is an integer in the range of from 0 to 300, preferably in the range of from 1 to 200, more preferably in the range of from 50 to 150,
and/or
wherein said first surface agent is preferably selected from the group consisting of poly(ethylene glycol) methyl ether thiol (PEGT), 1-dodecanethiol, 4-methylbenzenethiol, hexadecylamine and polyetheramine,
and/or
wherein said first surface agent compound is more preferably selected from the group consisting of poly(ethylene glycol) methyl ether thiol (PEGT) and polyetheramine, wherein said first surface agent compound has a weight average molecular weight in the range of from 500 to 500000 g/mol, preferably in the range of from 200 to 100000 g/mol, more preferably in the range of from 500 to 20 000 g/mol,
and
wherein said product dispersion medium consists of an additive dispersion medium or of a mixture of an additive dispersion medium and an intermediate dispersion medium,
and
wherein said additive dispersion medium comprises one or more compounds selected from the group consisting of substituted or unsubstituted, branched or linear, and aliphatic or aromatic organic compounds having a total number of at least 4 carbon atoms, including substituents, and preferably comprises one or more compounds selected from the group consisting of
alcohols,
ethers,
esters,
ketones
and
aromatic organic compounds, Generally, all aspects of the present invention discussed herein above in the context of
a method of preparing a product
apply mutatis mutandis to a product as described above and/or its use as a coating material or ink.

The invention also relates to a use of a product as described above as a coating material or ink.

The invention also relates to a use of a compound having one or more functional groups, at least one functional group of the compound being selected from the group consisting of thiol and amine, as a surface agent compound for modifying the surface of a silver nanowire.

The invention also relates to a use of a first surface agent compound having one or more functional groups, at least one functional group of the compound being selected from the group consisting of thiol and amine, for exchanging with a second surface agent compound which is different from the first surface agent compound and is attached to the surface of a silver nanowire.

Preferred is a use as described above, wherein said second surface agent compound is a capping agent used in the polyol process for making silver nanowires.

The invention also relates to a use of a compound having one or more functional groups, at least one functional group of the compound being selected from the group consisting of thiol and amine, as a dispersion enhancer for silver nanowires in a dispersion medium.

Preferred is a use as described above, wherein said silver nanowires are prepared using the polyol process.

The invention also relates to a method of coating the surface of an article, comprising the following step:
Applying a product as described above (or as described above as preferred) to the surface of said article, and optionally
hardening and/or drying the applied product on said surface.

Products as described above (or as described above as being preferred) are advantageous since they can be conveniently hardened or dried on a surface of an article.

A method as described above is preferred, wherein the step of applying a product as described above (or as described above as preferred) to the surface of said article is selected from the group consisting of spraying, painting, printing, and coating,
wherein the step of applying a product as described above (or as described above as preferred) to the surface of said article preferably comprises a self-metered coating or a pre-metered coating,
wherein the step of applying a product as described above (or as described above as preferred) to the surface of said article particularly preferably comprises a pre-metered coating.

Particularly preferred is a method of coating the surface of an article as described above or as described above as being preferred, wherein said intermediate dispersion medium and/or additive dispersion medium has a boiling point >30° C. at 1013 hPa, preferably a boiling point >120° C. at 1013 hPa.

Non-limiting examples of a pre-metered coating step are single layer or multiple layer slide-bead coating, single layer or multiple layer slot-bead coating, and single layer or multiple layer curtain coating.

The meaning of the different application steps can overlap (for example, a printing could also be a coating) and one example of a self-metered coating is the so-called "screen printing".

In the following, the base invention is further explained by summarizing preferred aspects thereof. The base invention on the one hand comprises the subject matter as defined in the claims and on the other hand comprises alternative subject matter.

1. Method of preparing a product comprising an amount of surface modified silver nanowires dispersed in a product dispersion medium, the method comprising the following steps:
(a) preparing or providing a first surface agent compound having one or more functional groups selected from the group consisting of thiol and amine, for attaching the first surface agent compound to the surface of a silver nanowire,
(b) preparing or providing an amount of silver nanowires which is dispersed in an intermediate dispersion medium,
(c) attaching said first surface agent compound prepared or provided in step (a) to the surface of said silver nanowires prepared or provided in step (b), so that surface modified silver nanowires result,
and
in one or more further steps after step (b) and before, in or after step (c) said intermediate dispersion medium is partially or completely exchanged against an additive dispersion medium which is different from the intermediate dispersion medium,
wherein said additive dispersion medium comprises one or more compounds selected from the group consisting of substituted or unsubstituted, branched or linear, and aliphatic or aromatic organic compounds having a total number of carbon atoms of at least 4 carbon atoms, including substituents, and preferably comprises one or more compounds selected from the group consisting of
alcohols,
ethers,
esters,
ketones
and
aromatic organic compounds,
and optionally
(d) adding one or more further constituents and/or conducting one or more further steps
so that said product results.

2. Method according to claim 1, wherein in step (b)
an amount of silver nanowires is prepared or provided, wherein to the surface of said silver nanowires a second surface agent compound is attached, wherein the second surface agent compound is different from the first surface agent compound,
and/or
an amount of silver nanowires is prepared using the polyol process, wherein to the surface of said amount of silver nanowires a second surface agent compound is attached, wherein the second surface agent compound is different from the first surface agent compound,
wherein the second surface agent compound is preferably a capping agent,
wherein the second surface agent compound more preferably is selected from the group consisting of polyvinylpyrrolidone (PVP), polyethylene oxide (PEO) and polymers containing imidazolidon-1-yl units.

3. Method according to any preceding claim, wherein in step (c) said second surface agent compound is partially or completely removed from the surface of said silver nanowires prepared or provided in step (b), preferably by exchanging said second surface agent compound by said first surface agent compound.

4. Method according to any preceding claim, wherein said resulting product comprises an amount of surface modified silver nanowires dispersed in a product dispersion medium,
wherein, preferably,
in step (b) an amount of silver nanowires is prepared or provided which is dispersed in an intermediate dispersion medium
and
in one or more further steps after step (c) said intermediate dispersion medium is partially or completely exchanged against an additive dispersion medium which is different from the intermediate dispersion medium.

5. Method according to any preceding claim, wherein
in step (b) an amount of silver nanowires is prepared or provided which is dispersed in an intermediate dispersion medium in a concentration in the range of from 0.001 wt.-% to 2 wt.-%, based on the total amount of the intermediate dispersion, wherein the intermediate dispersion has a homogeneity index of at least 80%,
and/or
the resulting product is a product dispersion which comprises an amount of surface modified silver nanowires dispersed in a product dispersion medium in a concentration in the range of from 0.001 wt.-% to 2 wt.-%, based on the total amount of the product dispersion, wherein the product dispersion has a homogeneity index of at least 80%.

6. Method according to any preceding claim, wherein said intermediate dispersion medium and/or said additive dispersion medium has a boiling point >30° C. at 1013 hPa, preferably a boiling point >120° C. at 1013 hPa.

7. Method according to any preceding claim, wherein
the ratio of the total weight of surface agent compounds attached to the surface of said surface modified silver nanowires to the total weight of said surface modified silver nanowires is in the range of from 0.01 to 0.3 and is determined by thermogravimetry.

8. Method according to any preceding claim, wherein said first surface agent compound prepared or provided in step (a) having one or more functional groups is selected from the group consisting of
compounds of formula (I)

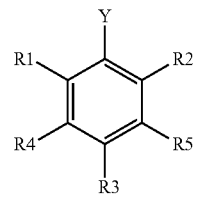

formula (I)

wherein
Y is SH or $NH_2$,
and
R1, R2, R3, R4 and R5 independently of each other are
hydrogen,
an alkyl radical having a total number of carbon atoms of from 1 to 10 carbon atoms,
or
an alkenyl radical having a total number of carbon atoms of from 2 to 10 carbon atoms.
and
compounds of formula (II)

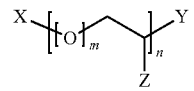

formula (II)

wherein
Y is SH or $NH_2$,
X is hydrogen, methyl (—$CH_3$), ethyl (—$CH_2$—$CH_3$), aminomethyl (—$CH_2$—$NH_2$) or 2-aminoethyl (—$CH_2$—$CH_2$—$NH_2$),
each Z is independently of the meaning of any other Z hydrogen, methyl, ethyl or a hydroxy group,
m is 0 or 1
and
n is an integer in the range of from 0 to 300, preferably in the range of from 1 to 200, more preferably in the range of from 50 to 150,
and/or
wherein said first surface agent compound prepared or provided in step (a) is selected from the group consisting of poly(ethylene glycol) methyl ether thiol (PEGT), 1-dodecanethiol, 4-methylbenzenethiol, hexadecylamine and polyetheramine,
and/or
wherein said first surface agent compound prepared or provided in step (a) is selected from the group consisting of poly(ethylene glycol) methyl ether thiol (PEGT) and polyetheramine, wherein said first surface agent compound has a weight average molecular weight in the range of from 500 to 500000 g/mol, preferably in the range of from 200 to 100000 g/mol, more preferably in the range of from 500 to 20000 g/mol.

9. Product (a) comprising an amount of surface modified silver nanowires, wherein each of said surface modified silver nanowires can be prepared by attaching to the surface of a silver nanowire a first surface agent compound having one or more functional groups for attaching the first surface agent compound to the surface of the silver nanowire, at least one functional group of the first surface agent compound being selected from the group consisting of thiol and amine, wherein said first surface agent compound is selected from the group consisting of poly(ethylene glycol) methyl ether thiol (PEGT), 4-methylbenzenethiol, hexadecylamine and polyetheramine and optionally one or more further constituents and/or (b) obtained or obtainable by a method according to any preceding claim.

10. Use of a product according to claim 9 as a coating material or ink.

11. Use of a compound having one or more functional groups, at least one functional group of the compound being selected from the group consisting of thiol and amine, as a surface agent compound for modifying the surface of a silver nanowire, wherein said surface agent compound is selected from the group consisting of poly(ethylene glycol) methyl ether thiol (PEGT), 4-methylbenzenethiol, hexadecylamine and polyetheramine.

12. Use of a first surface agent compound having one or more functional groups, at least one functional group of the compound being selected from the group consisting of thiol and amine, for exchanging with a second surface agent compound which is different from the first surface agent compound and is attached to the surface of a silver nanowire, wherein said first surface agent compound is selected from the group consisting of poly(ethylene glycol) methyl ether thiol (PEGT), 4-methylbenzenethiol, hexadecylamine and polyetheramine and wherein said second surface agent compound preferably is a capping agent used in the polyol process for making silver nanowires.

13. Use of a compound having one or more functional groups, at least one functional group of the compound being selected from the group consisting of thiol and amine, as a dispersion enhancer for silver nanowires in a dispersion medium, wherein said compound is selected from the group consisting of poly(ethylene glycol) methyl ether thiol (PEGT), 4-methylbenzenethiol, hexadecylamine and polyetheramine and wherein said silver nanowires are preferably prepared using the polyol process.

14. Method of coating the surface of an article, comprising the following step:

Applying a product according to claim 9 to the surface of said article, and optionally hardening and/or drying the applied product on said surface.

15. Method according to claim 14, wherein the step of applying a product according to claim 9 to the surface of said article is selected from the group consisting of spraying, painting, printing, and coating, wherein the step of applying a product according to claim 9 to the surface of said article preferably comprises a self-metered coating or a pre-metered coating, wherein the step of applying a product according to claim 9 to the surface of said article particularly preferably comprises a pre-metered coating.

DESCRIPTION OF FIGURES

In FIG. 1, surface modified silver nanowires having PVP attached to their surface, dispersed in dipropylene glycol methyl ether acetate are shown. FIG. 1 shows that the surface modified silver nanowires having attached to their surface PVP agglomerate and are thus not randomly dispersed in the dipropylene glycol methyl ether acetate. The microscopy image shown in FIG. 1 was measured by dark-field microscopy.

In FIG. 2, a dispersion of surface modified silver nanowires having PEGT with a weight average molecular weight of 6000 g/mol attached to their surface in dipropylene glycol methyl ether acetate are shown. FIG. 2 shows that the surface modified silver nanowires having attached to their surface PEGT with a weight average molecular weight of 6000 g/mol are homogeneously dispersed in the dipropylene glycol methyl ether acetate. The microscopy image shown in FIG. 2 was measured by dark-field microscopy.

In FIG. 3, a dispersion of surface modified silver nanowires having PEGT with a weight average molecular weight of 800 g/attached to their surface mol in a mixture of dipropylene glycol methyl ether acetate and vinyl chloride co- and acrylate as a binder are shown. FIG. 3 shows that the surface modified silver nanowires having attached to their surface PEGT with a weight average molecular weight of 800 g/mol are homogeneously dispersed. The image shown in FIG. 3 has been measured by scanning electron microscopy.

In FIG. 4, a dispersion of surface modified silver nanowires having PEGT with a weight average molecular weight of 6000 g/mol attached to their surface in a mixture of dipropylene glycol methyl ether acetate and vinyl chloride co- and acrylate as a binder is shown. FIG. 4 shows that the surface modified silver nanowires having attached to their surface PEGT with a weight average molecular weight of 6000 g/mol are homogeneously dispersed. The image shown in FIG. 4 has been measured by scanning electron microscopy.

In FIG. 5, a dispersion of surface modified silver nanowires having PEGT with a weight average molecular weight of 6000 g/mol and PEGT with a weight average molecular weight of 800 g/mol attached to their surface in a mixture of dipropylene glycol methyl ether acetate and vinyl chloride co- and acrylate as a binder are shown. FIG. 5 shows that said surface modified silver nanowires are homogeneously dispersed. FIG. 5 was measured by scanning electron microscopy.

Figure 1:
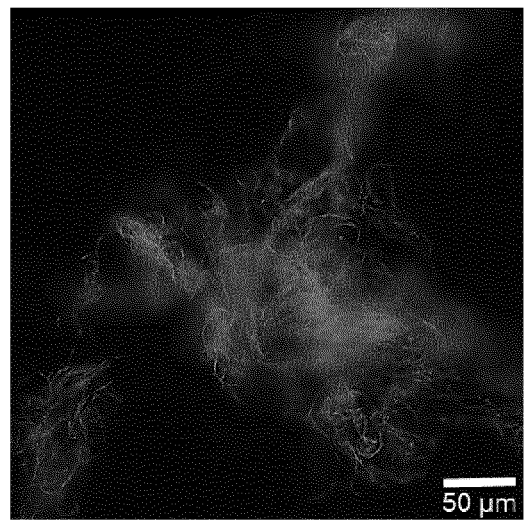
FIG. 1.

The invention is further described by the experimental examples below:

EXAMPLES

Determination Methods:
1. Thermogravimetric analysis
Thermogravimetric analysis was conducted on a TA instrument.
2. Optical microscopy
Optical microscopy images have been obtained by dark-field microscopy on Olympus BX 51 instrument.
3. Scanning electron microscopy
Scanning electron microscopy images have been obtained on a Phenom, Pro-X instrument.
4. Sheet resistance
The sheet resistance of a dried layer has been measured by a four point probe station on a Lucas lab pro-4.
5. Optical properties
The transmission and the haze have been measured according to ASTM D1003 by a haze-gard plus hazemeter of the supplier BYK-Gardener.
6. Contact angle experiments
The contact angle of different silver nanowire layers on a polymer substrate have been measured by an OCA measuring instruments from dataphysics.
7. Homogeneity index
A typical and preferred intermediate or product dispersion has a concentration of silver nanowires in the range of from 0.001 wt.-% to 2 wt.-%. In particular the homogeneity index of such intermediate or product dispersions can be determined according to the following routine:
To determine the homogeneity index, a dark-field microscopic image is taken of 0.05 ml of a dispersion by an Olympus BX 51 microscope of the company Olympus. The magnification is 200×, where the ocular lens magnification of the microscope is 10× and the objective lens magnification is 20×.
The size of a taken image corresponds to an area of 0.12 mm$^2$ (which can be determined with the scale bar on the image).
Subsequently, the dark-field microscopic image is divided into 400 identical square units.
In a following step, the ratio of the number of square units comprising silver nanowires to the total number of overall square units is determined. For each sample, the average is calculated of three ratios obtained from a corresponding number of microscopic images of the same dispersion sample, taken at randomly chosen, different positions in the dispersion sample. This average of three ratios is defined as the homogeneity index.
The homogeneity index for the perfectly homogeneously dispersed sample is 100%. A sample having a homogeneity index above 80% is considered as 'stable'.

EXPERIMENTS

Experiment 1

Experiment 1.1

Nitrogen was bubbled through 500 ml of ethanol with a flow rate of 5 ml N$_2$/min for half an hour in order to remove the oxygen dissolved in the ethanol.

Step (a):
Seven solutions, each comprising one specific first surface agent compound, were prepared in the oxygen-free ethanol with different concentrations as shown in table 1a.

TABLE 1a

Different stirring times of the prepared solutions 1 to 7

| | solution | | | | | | |
|---|---|---|---|---|---|---|---|
| | 1 | 2 | 3 | 4 | 5 | 6 | 7 |
| concentration of the first surface agent compound (µL) | 200 | 50 | 50 | 200 | 50 | 200 | 50 |

As examples of first surface agent compounds, in each of the seven solutions, one of the following compounds was added:
solution 1: PVP (CAS-number: 9003-39-8) having a weight average molecular weight of 40,000 g/mol (hereinafter designated as PVP),
solution 2: 1-dodecanethiol,
solution 3: PEGT having a weight average molecular weight of 800 g/mol,
solution 4: PEGT having a weight average molecular weight of 6000 g/mol,
solution 5: 1-aminohexadecane (hereinafter designated as hexadecylamine),
solution 6: polyetheramine (CAS-number: 83713-01-3) having a weight average molecular weight of 2000 g/mol (hereinafter designated as polyetheramine),
or
solution 7: 4-methylbenzenethiol.

Step (b):
An intermediate dispersion with a concentration of 0.5 wt.-% of surface modified silver nanowires having PVP attached to their surface was prepared.

Step (c):
To 200 ml of each of the prepared surface agent compounds containing solutions, 16 ml of the prepared intermediate dispersion are added so that, in each case, a reaction dispersion is obtained, respectively (reaction dispersions 1, 2, 3, 4, 5, 6 and 7).

Under a nitrogen atmosphere, each of the reaction dispersions is stirred for a period as specified in Table 1 so that the PVP attached to the surface of the surface modified silver nanowires is exchanged by the corresponding first surface agent compound (as described under step (a) above). In each case, an intermediate product dispersion comprising surface modified silver nanowires having attached to their surface the corresponding first surface agent compounds results.

TABLE 1

Different stirring times of the reaction dispersions

| | reaction dispersions | | | | | | |
|---|---|---|---|---|---|---|---|
| | 1 | 2 | 3 | 4 | 5 | 6 | 7 |
| stirring time (min.) | 3 | 3 | 3 | 120 | 3 | 120 | 60 |

Step (d):

Each of the intermediate product dispersions is centrifuged for 15 min at 4000 rpm and, in each case, the intermediate product dispersion medium is separated from the surface modified silver nanowires which are subsequently redispersed in 30 ml of a 1:1 ethanol/acetone solution resulting, in each case, in an ethanol/acetone dispersion.

Subsequently, the centrifugation, separation, and redispersion step have been repeated for each of the seven ethanol/acetone dispersions followed by another centrifugation and another separation step so that the following six samples of solid surface modified silver nanowires resulted:

sample 1: surface modified silver nanowires having PVP attached to their surface, sample 2: surface modified silver nanowires having 1-dodecanethiol attached to their surface (as an example for the method of the invention), sample 3: surface modified silver nanowires having PEGT having a weight average molecular weight of 800 g/mol attached to their surface (as an example of a product of the invention), sample 4: surface modified silver nanowires having PEGT having a weight average molecular weight of 6000 g/mol attached to their surface (as an example of a product of the invention), sample 5: surface modified silver nanowires having hexadecylamine attached to their surface (as an example of a product of the invention), sample 6: surface modified silver nanowires having polyetheramine attached to their surface (as an example of a product of the invention), and sample 7: surface modified silver nanowires having 4-methylbenzenethiol attached to their surface (as an example of a product of the invention).

Subsequently, the resulting samples 1-7 were redispersed in various product dispersion media as depicted in Table 2 below and, in each case, a product dispersion resulted. The concentration of the surface modified silver nanowires having attached to their surface the corresponding surface agent compound in the resulting product dispersion was 0.1 wt.-%, based on the total weight of the product dispersion.

In a next step, the homogeneity indices of the resulting product dispersions comprising (i) surface modified silver nanowires (i-comparative) having PVP attached to their surface or (i-inventive) having surface agent compounds attached to their surface and (ii) different dispersion media have been measured by optical microscopy. The dispersions comprising surface modified silver nanowires (i-inventive) having surface agent compounds attached to their surface (samples 2 to 6)

are examples of products of the invention. The results are summarized in Table 2.

TABLE 2

Cells showing the letter Y correspond to dispersions with a homogeneity index above 80% (sufficient for an industrial application in coating or printing processes). Cells of Table 2 showing the letter N correspond to dispersions with a homogeneity index below 80% (insufficient for an industrial application in coating or printing processes).

| product dispersion medium | sample 1 comparative | sample 2 | sample 3 | sample 4 | sample 5 | sample 6 | sample 7 |
|---|---|---|---|---|---|---|---|
| | | | according to the invention | | | | |
| water | Y | N | Y | Y | Y | Y | N |
| ethanol | Y | Y | Y | Y | Y | Y | Y |
| 2-propanol | Y | Y | Y | Y | Y | Y | Y |
| toluene | N | N | N | Y | N | N | N |
| dipropylene glycol methyl ether acetate | N* | Y | Y | Y** | Y | Y | Y |
| butyl acetate | N | N | Y | Y | Y | N | N |
| butanone | N | N | N | Y | N | Y | N |
| acetone | N | N | N | Y | N | Y | N |
| THF | N | Y | Y | Y | Y | Y | Y |

*A micospcopy image of the dispersion of surface modified silver nanowires having PVP attached to their surface in dipropylene glycol methyl ether acetate is shown in FIG. 1 below.

Figure 2:
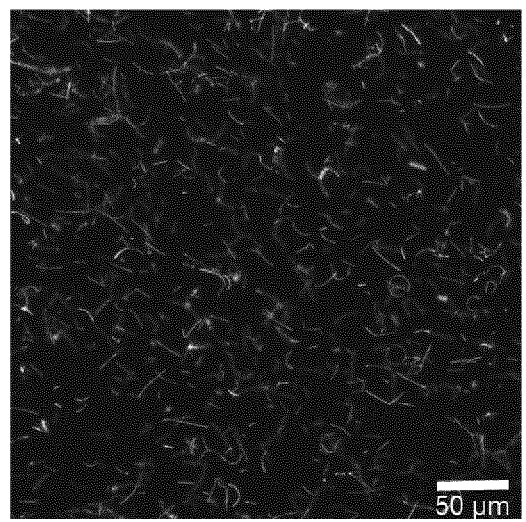
FIG. 2.

**A micospcopy image of the dispersion of surface modified silver nanowires having PEGT having a weight average molecular weight of 6000 g/mol attached to their surface in dipropylene glycol methyl ether acetate is shown in FIG. 2 below.

The results depicted in table 2 show that silver nanowires having attached to the surface 1-dodecanethiol, PEGT having a weight average molecular weight of 800 g/mol and PEGT having a weight average molecular weight of 6000 g/mol, hexadecylamine, polyetheramine having a weight average molecular weight in the range of 2000 g/mol and 4-methylbenzenethiol can be dispersed in different organic compounds.

Experiment 1.2

Dispersions comprising water, ethanol or 2-propanol were stored for two weeks and four weeks and their homogeneity indices were determined after storage (see table 2 i) and table ii) below, respectively).

The results depicted in table 2 i) show that silver nanowires having attached to the surface 1-dodecanethiol, PEGT having a weight average molecular weight of 800 g/mol and PEGT having a weight average molecular weight of 6000 g/mol, hexadecylamine polyetheramine having a weight average molecular weight in the range of 2000 g/mol and 4-methylbenzenethiol can be homogeneously dispersed in water, ethanol or 2-propanol and are stable over a period of two weeks.

In contrast thereto, silver nanowires having attached to the surface PVP were not anymore homogeneously dispersed in 2-propanol after storage over a period of two weeks.

TABLE 2 i)

Cells showing the letter Y correspond to dispersions with a homogeneity index above 80% after storage over a period of two weeks. Cells of Table 2 i) showing the letter N correspond to dispersions with a homogeneity index below 80% after storage over a period of two weeks.

| product dispersion medium | sample 1 comparative | sample 2 | sample 3 | sample 4 | sample 5 | sample 6 | sample 7 |
| --- | --- | --- | --- | --- | --- | --- | --- |
|  |  | according to the invention |  |  |  |  |  |
| water | Y | N | Y | Y | Y | Y | N |
| ethanol | Y | Y | Y | Y | Y | Y | Y |
| 2-propanol | N | Y | Y | Y | Y | Y | Y |

The results depicted in table 2 ii) show that silver nanowires having attached to the surface 1-dodecanethiol, PEGT having a weight average molecular weight of 800 g/mol and PEGT having a weight average molecular weight of 6000 g/mol hexadecylamine, polyetheramine and 4-methylbenzenethiol can be homogeneously dispersed in water, ethanol or 2-propanol and are stable over a period of four weeks.

In contrast thereto, silver nanowires having attached to the surface PVP were not anymore homogeneously dispersed in 2-propanol after storage over a period of four weeks.

TABLE 2 ii)

Cells showing the letter Y correspond to dispersions with a homogeneity index above 80% after storage over four weeks. Cells of Table 2 ii) showing the letter N correspond to dispersions with a homogeneity index below 80% after storage over a period of four weeks.

| product dispersion medium | sample 1 comparative | sample 2 | sample 3 | sample 4 | sample 5 | sample 6 | sample 7 |
| --- | --- | --- | --- | --- | --- | --- | --- |
|  |  | according to the invention |  |  |  |  |  |
| water | Y | N | Y | Y | Y | Y | N |
| ethanol | Y | Y | Y | Y | Y | Y | Y |
| 2-pro-panol | N | Y | Y | Y | Y | Y | Y |

Experiment 1.3

Different Dispersions Comprising
surface modified silver nanowires having PVP attached to their surface in different dispersion media (sample 1),
surface modified silver nanowires having 1-dodecanethiol attached to their surface in different dispersion media (sample 2),
surface modified silver nanowires having PEGT having a weight average molecular weight of 800 g/mol attached to their surface in dipropylene glycol methyl ether acetate (sample 3),
surface modified silver nanowires having PEGT having a weight average molecular weight of 6000 g/mol attached to their surface in different dispersion media (sample 4),
surface modified silver nanowires having polyetheramine having a weight average molecular weight in the range of 2000 g/mol attached to their surface in different dispersion media (sample 6)
or
surface modified silver nanowires having 4-methylbenzenethiol attached to their surface in dipropylene glycol methyl ether acetate (sample 7)
were stored for two weeks and their homogeneity indices were determined after storage (see table 2 iii) below).

TABLE 2 iii)

Cells showing the letter Y correspond to dispersions with a homogeneity index above 80% after storage over a period of two weeks. Cells of Table 2 iii) showing the letter N correspond to dispersions with a homogeneity index below 80% after storage over a period of two weeks.

| product dispersion medium | sample 1 comparative | sample 2* | sample 3 | sample 4* | sample 6** | sample 7 |
|---|---|---|---|---|---|---|
| | | | according to the invention | | | |
| dipropylene glycol methyl etheracetate | N | Y | Y | Y | Y | Y |

*Having been stored for a storage period of two weeks, sample 2 was still homogeneously dispersed when tetrahydrofuran was the dispersion medium (in contrast to a corresponding dispersion comprising silver nanowires having attached to the surface PVP).
**Having been stored for a storage period of two weeks, sample 4 was still homogeneously dispersed when toluene or acetone was the dispersion medium (in contrast to a corresponding dispersion comprising silver nanowires having attached to the surface PVP).
***Having been stored for a storage period of two weeks, sample 6 was still homogeneously dispersed when butanone, tetrahydrofuran or acetone was the dispersion medium (in contrast to a corresponding dispersion comprising silver nanowires having attached to the surface PVP).

The results depicted in table 2 iii) show that silver nanowires having attached to the surface 1-dodecanethiol, PEGT having a weight average molecular weight of 800 g/mol, PEGT having a weight average molecular weight of 6000 g/mol, and polyetheramine having a weight average molecular weight in the range of 2000 g/mol can be homogeneously dispersed in dipropylene glycol methyl ether acetate and that the corresponding dispersions are stable over a period of two weeks.

In contrast to the results above, silver nanowires having attached to the surface PVP could not be homogeneously dispersed in the corresponding dispersion media.

Experiment 1.4

Dispersions Comprising
surface modified silver nanowires having PVP attached to their surface in different dispersion media (sample 1),
surface modified silver nanowires having 1-dodecanethiol attached to their surface in different dispersion media (sample 2),
surface modified silver nanowires having PEGT having a weight average molecular weight of 800 g/mol attached to their surface in dipropylene glycol methyl ether acetate (sample 3),
surface modified silver nanowires having PEGT having a weight average molecular weight of 6000 g/mol attached to their surface in different dispersion media (sample 4),
surface modified silver nanowires having polyetheramine having a weight average molecular weight in the range of 2000 g/mol attached to their surface in dipropylene glycol methyl ether acetate (sample 6),
or
surface modified silver nanowires having 4-methylbenzenethiol attached to their surface in dipropylene glycol methyl ether acetate (sample 7)
were stored for four weeks and their homogeneity indices were determined after storage (see table 2 iv) below).

TABLE 2 iv)

Cells showing the letter Y correspond to dispersions with a homogeneity index above 80% after storage over a period of four weeks. Cells of Table 2 iv) showing the letter N correspond to dispersions with a homogeneity index below 80% after storage over a period of four weeks.

| product dispersion medium | sample 1 comparative | sample 2* | sample 3 | sample 4** | sample 6 | sample 7 |
|---|---|---|---|---|---|---|
| | | | according to the invention | | | |
| dipropylene glycol methyl ether acetate | N | Y | Y | Y | Y | Y |

*Having been stored for a storage period of four weeks, sample 2 was still homogeneously dispersed in tetrahydrofuran (in contrast to a corresponding dispersion comprising silver nanowires having attached to the surface PVP).
**Having been stored for a storage period of four weeks, sample 4 was still homogeneously dispersed in acetone or toluene (in contrast to a corresponding dispersion comprising silver nanowires having attached to the surface PVP).

The results depicted table 2 iv) show that silver nanowires having attached to the surface 1-dodecanethiol, PEGT having a weight average molecular weight of 800 g/mol, PEGT having a weight average molecular weight of 6000 g/mol and polyetheramine can be homogeneously dispersed in dipropylene glycol methyl ether acetate and that the corresponding dispersions are stable over a period of four weeks.

In contrast to the results above, silver nanowires having attached to the surface PVP could not be homogeneously dispersed in the corresponding dispersion media.

Example 2

Example 2.1

2 ml of a product dispersion comprising dipropylene glycol methyl ether acetate and surface modified silver nanowires having attached to their surface PVP as prepared in experiment 1 (see table 2 above) was mixed with 0.01 g of vinyl chloride co- and acrylate polymers (vinyl chloride co- and terpolymersacrylate polymers is a product from Wacker Chemie AG with the material number 291132 VINNOL® E 15/40 A TF) so that a silver ink composition resulted.

The concentration of said surface modified silver nanowires in the silver ink composition resulting in Example 2.1 was 0.5 wt.-%. The concentration of said vinyl chloride co- and acrylate polymer in the silver ink composition was 0.5 wt.-%.

The resulting silver ink composition could not successfully be printed onto a substrate due to the aggregation of surface modified silver nanowires having attached to their surface PVP in said silver ink.

Example 2.2

Surface modified silver nanowires having attached to their surface PEGT with a weight average molecular weight of 800 g/mol were prepared as described above in experiment 1 (sample 3).

2 ml of the product dispersion comprising dipropylene glycol methyl ether acetate and surface modified silver nanowires having attached to their surface PEGT with a weight average molecular weight of 800 g/mol as prepared in experiment 1 (see table 2 above) was mixed with 0.01 g of vinyl chloride co- and acrylate polymers is a product from Wacker Chemie AG with the material number 291132 VINNOL® E 15/40 A TF) so that a silver ink composition resulted.

The silver ink composition was completely mixed by LAU Disperser DAS 200 (DIN 53 238) for 15 min.

The concentration of said surface modified silver nanowires in the silver ink composition resulting in Experiment 2.2 was 0.5 wt.-%. The concentration of said vinyl chloride co- and acrylate in the silver ink composition was 0.5 wt.-%.

The silver ink composition was applied to a substrate by blade coating (coating speed: 5 cm/s) to give a wet ink layer on the polymer substrate having a thickness of 6 μm. The blade coating was conducted by K303 Modell 625 from Erichsen at room temperature. More information on the blade coating can be found in the application with the international application number PCT/EP2015/068421 and ASTM D823.

The wet ink layer on the polymer substrate was dried at 130° C. for 5 minutes to give a dried ink layer on the polymer substrate. During this heat treatment, the PEGT with a weight average molecular weight of 800 g/mol remained attached to the surface of said surface modified silver nanowires and said surface modified silver nanowires remained homogeneously dispersed in the wet ink layer on the polymer substrate until it was completely dried.

Figure 3:
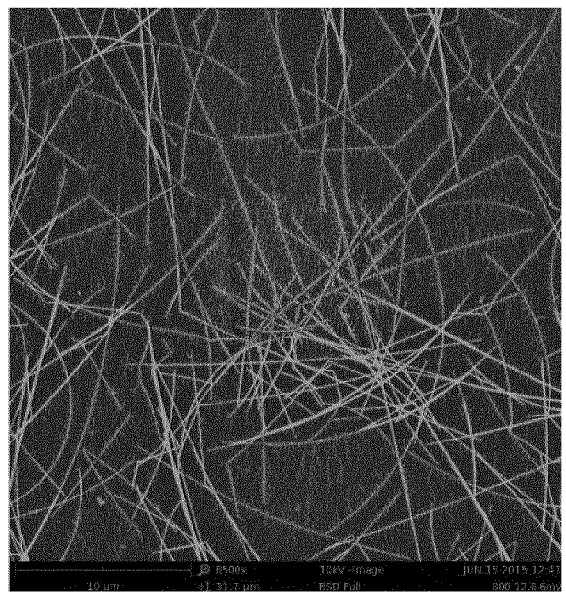
FIG. 3.
Figure 9:
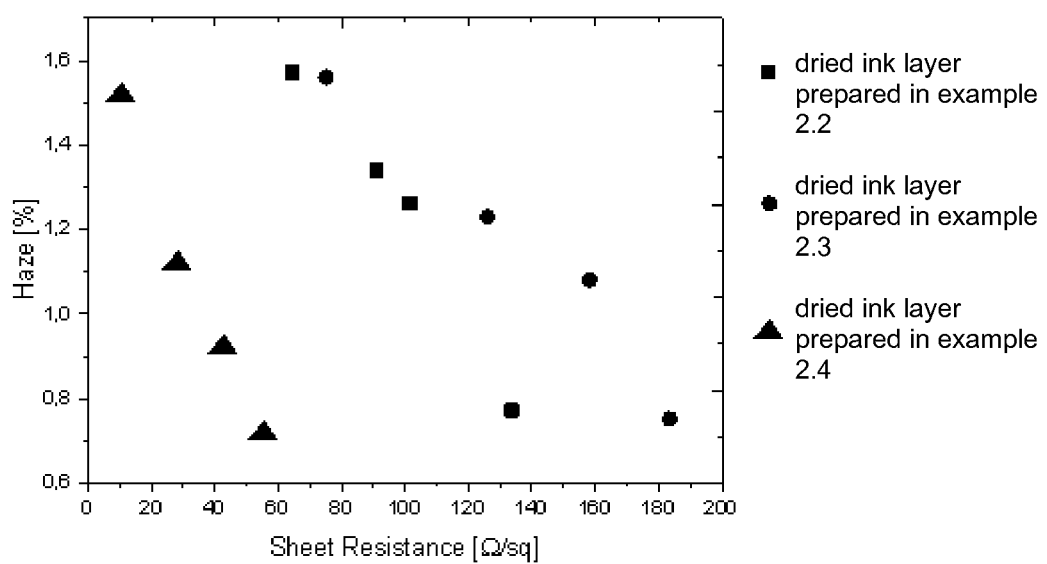
FIG. 9 A graph showing the haze and sheet resistance of the dried ink layers prepared in example 2.

The haze and sheet resistance of the dried ink layer on the polymer substrate was determined and is shown in FIG. 9. A scanning electron microscopy image of the dried ink layer on the polymer substrate is shown in FIG. 3.

Example 2.3

Surface modified silver nanowires having attached to their surface PEGT with a weight average molecular weight of 6000 g/mol were prepared as described above in experiment 1 (sample 4).

2 ml of the product dispersion comprising dipropylene glycol methyl ether acetate and surface modified silver nanowires having attached to their surface PEGT with a weight average molecular weight of 6000 g/mol as prepared in experiment 1 (see table 2 above) was mixed with 0.01 g of vinyl chloride co- and acrylate polymer is a product from Wacker Chemie AG with the material number 291132 VINNOL® E 15/40 A TF) so that a silver ink composition resulted.

The silver ink composition was mixed by LAU Disperser DAS 200 for 15 min.

The concentration of said surface modified silver nanowires in the silver ink composition resulting in Experiment 2.3 was 0.5 wt.-%. The concentration of said vinyl chloride co- and acrylate in the silver ink composition was 0.5 wt.-%.

The silver ink composition was applied to a substrate by blade coating (coating speed: 5 cm/s) to give a wet ink layer on the polymer substrate having a thickness of 6 μm.

The wet ink layer on the polymer substrate was dried at 130° C. for 5 minutes to give a dried ink layer on the polymer substrate. During this heat treatment, the PEGT with a weight average molecular weight of 6000 g/mol remained attached to the surface of said surface modified silver nanowires and said surface modified silver nanowires remained homogeneously dispersed in the wet ink layer on the polymer substrate until it was completely dried.

Figure 4:
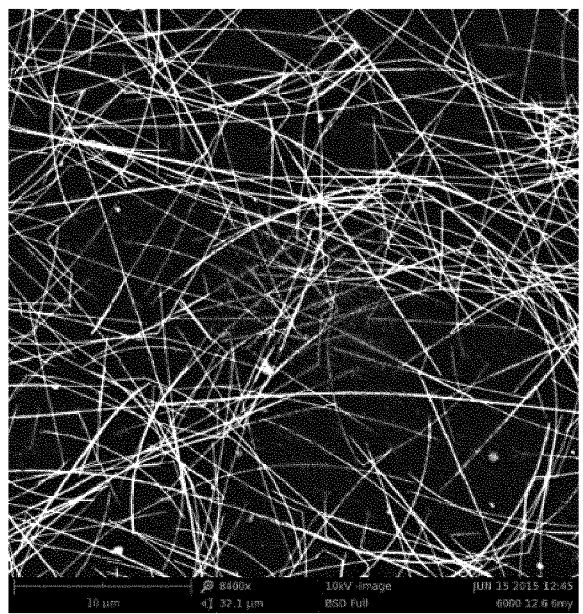
FIG. 4.

The haze and sheet resistance of the dried ink layer on the polymer substrate was determined and is shown in FIG. 9. A scanning electron microscopy image of the dried ink layer on the polymer substrate is shown in FIG. 4.

Example 2.4

Step (a):
A first solution containing PEGT with a weight average molecular weight of 6000 g/mol with a concentration of 200 μM was prepared in the oxygen-free ethanol.

A second solution containing PEGT with a weight average molecular weight of 800 g/mol with a concentration of 5 mM was prepared in the oxygen-free ethanol.

Step (b):
An intermediate dispersion with a concentration of 0.5 wt.-% of surface modified silver nanowires having PVP attached to their surface was prepared.

Step (c):
200 ml of the first solution were mixed with 16 ml of the intermediate disperison with a concentration of 0.5 wt.-% of surface modified silver nanowires having PVP attached to their surface for 120 min under a nitrogen atmospheres, so that the PVP attached to the surface of the surface modified silver nanowires is exchanged by PEGT with a weight average molecular weight of 6000 g/mol. Then 5 mL of the second solution were added into the mixture under stirring. An intermediate product dispersion comprising surface modified silver nanowires having attached to their surface PEGT with a weight average molecular weight of 800 g/mol and PEGT with a weight average molecular weight of 6000 g/mol results.

Step (d):
The intermediate product dispersion is centrifuged for 15 min at 6000 rpm and the intermediate product dispersion medium is separated from the surface modified silver nanowires which are redispersed in 30 ml of fresh 1:1 ethanol/acetone solution resulting in an ethanol/acetone dispersion.

Subsequently, the centrifugation, separation, redispersion steps have been repeated for the ethanol/acetone dispersion followed by another centrifugation and separation step so that surface modified silver nanowires having attached to their surface PEGT with a weight average molecular weight of 800 g/mol and PEGT with a weight average molecular weight of 6000 g/mol result.

The surface modified silver nanowires having attached to their surface PEGT with a weight average molecular weight of 800 g/mol and PEGT with a weight average molecular weight of 6000 g/mol were dispersed in dipropylene glycol methyl ether acetate resulting in a dispersion having a concentration of said surface modified silver nanowires of 0.5 wt.-%, based on the total weight of the surface modified silver nanowires and the PEGT attached to their surface.

Step (e):

To the resulting dispersion, vinyl chloride co- and acrylate polymer was added to give a silver ink composition. The silver ink composition was completely mixed by LAU Disperser DAS 200 (DIN 53 238) for 15 min.

The concentration of said surface modified silver nanowires in the silver ink composition was 0.5 wt.-%. The concentration of said vinyl chloride co- and acrylate in the silver ink composition was 0.5 wt.-%.

The silver ink composition was applied to a substrate by blade coating (coating speed: 5 cm/s) to give a wet ink layer on the polymer substrate having a thickness of 6 µm.

The wet ink layer on the polymer substrate was dried at 130° C. for 5 minutes to give a dried ink layer on the polymer substrate. During this heat treatment, the PEGT with a weight average molecular weight of 800 g/mol and PEGT with a weight average molecular weight of 6000 g/mol remained attached to the surface of said surface modified silver nanowires and said surface modified silver nanowires remained homogeneously dispersed in the wet ink layer on the polymer substrate until it was completely dried.

Example 2.5

Results of Examples 2.2, 2.3 and 2.4

Figure 5:
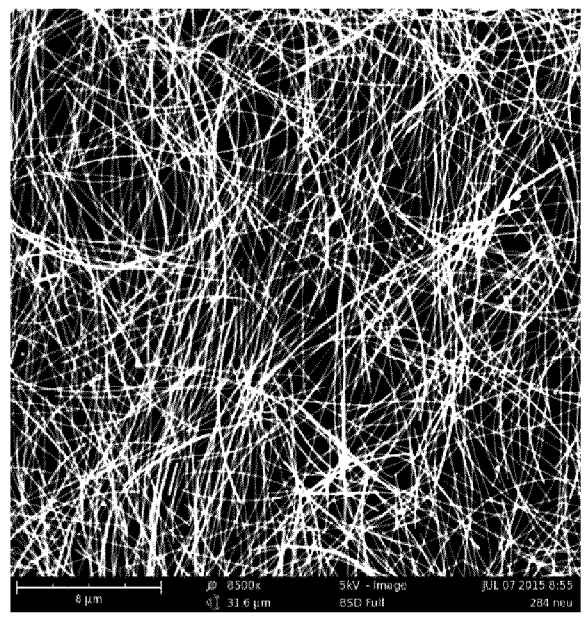
FIG. 5.
Figure 6:
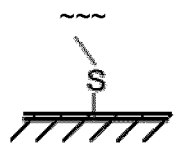
FIG. 6: A sketch of a surface agent compound attached to the surface of a surface modified silver nanowire is shown in FIG. 6. The surface bound functional group of the surface agent compound is thiolate (deprotonated thiol group). The Ag surface is depicted by a bold horizontal line, the "backbone" of the surface agent compound is depicted by ~~~.
Figure 7:
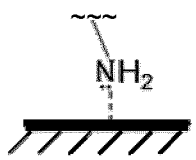
FIG. 7: A sketch of a surface agent compound attached to the surface of a surface modified silver nanowire is shown in FIG. 7. The surface bound functional group of the surface agent compound is amine. The Ag surface is depicted by a bold horizontal line, the "backbone" of the surface agent compound is depicted by ~~~.
Figure 8:
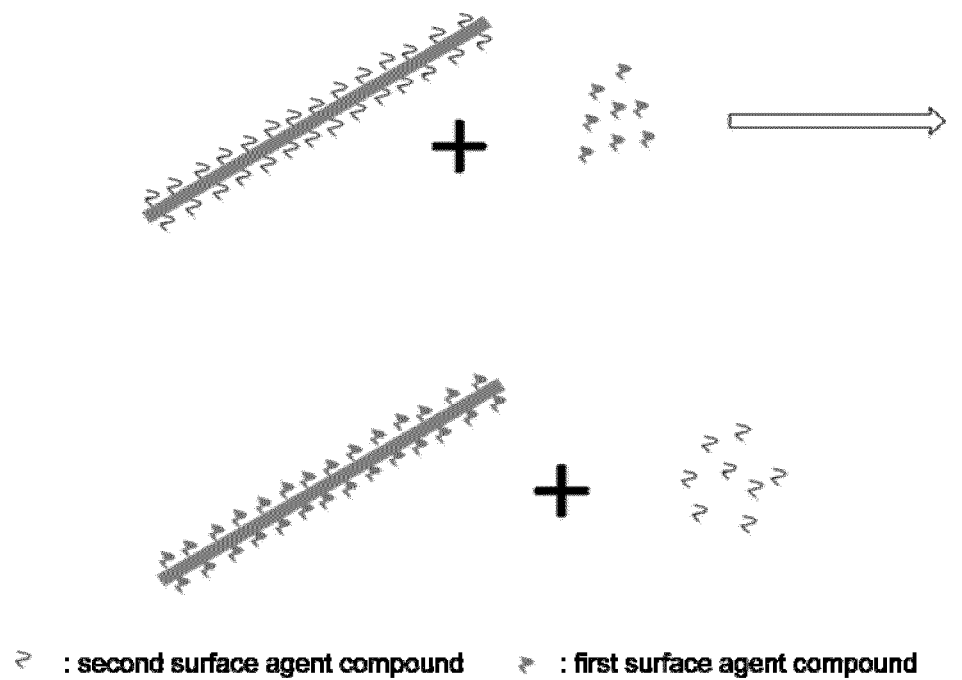
FIG. 8: A sketch of an exchange of second surface agent compounds attached to the surface of a surface modified silver nanowire by first surface agent compounds is shown in FIG. 8.

A scanning electron microscopy image of the dried ink layer on the polymer substrate is shown in FIG. 5.

For each example (i.e. examples 2.2, 2.3 or 2.4), the haze and sheet resistance of four dried ink layers on a polymer substrate (samples) prepared according to the corresponding example were determined and the results of all four samples for each example are shown in FIG. 9. Due to the varying layer thickness of the four layers prepared according example 2.2, 2.3 or 2.4, the haze and the sheet resistance is slightly different. In general, the lower the haze and the sheet resistance, the more suitable the corresponding dispersion is for use as a silver ink composition.

It can be concluded from FIG. 9 that both PEGT with a weight average molecular weight of 6000 g/mol or PEGT with a weight average molecular weight of 800 g/mol can be successfully used to modify the surface of silver nanowires for use in a silver ink composition. Moreover, the dispersion comprising surface modified silver nanowires (AgNWs) having attached to their surface PEGT with a weight average molecular weight of 6000 g/mol and PEGT with a weight average molecular weight of 800 g/mol gives the best performance.

Experiment 2.6

To a dispersion as resulting in step (d) of Experiment 2.4, 0.01 g of vinyl chloride co- and acrylate was added to give a silver ink composition.

The concentration of said surface modified silver nanowires in the silver ink composition was 0.2 wt.-%.

The silver ink composition was completely mixed by LAU Disperser DAS 200 (DIN 53 238) for 15 min.

The silver ink composition was applied to a polymer substrate using a slot bead dye with a 15 cm broadness at varying flow from 2 mL/min to 10 mL/min and a web speed between 4 m/min and 8 m/min so that the thickness of the resulting wet ink layer on the polymer substrate was in between 3 µm and 21 µm. The each of the wet ink layers was dried at 130° C. for 5 minutes to give a dried ink layer on a polymer substrate.

Results are summarized in the table 2a.

TABLE 2a

Haze and sheet resistance of different dried ink layers on the polymer substrates as prepared in experiment 2.6

| Thickness of wet ink layers (µm) | Total Haze of dried ink layer (%) | Net Haze of dried ink layer (%) | Sheet Resistance of dried ink layer (OPS) |
| --- | --- | --- | --- |
| 8 | 0.88 | 0.45 | 112 |
| 10 | 1.05 | 0.62 | 82 |
| 12 | 1.13 | 0.7 | 63 |
| 14 | 1.71 | 1.28 | 41 |
| 17 | 2.17 | 1.74 | 38 |
| 21 | 2.34 | 1.91 | 32 |

Only when the thickness of the resulting wet ink layer on the polymer substrate is in between 8 µm and 21 µm, the wetting is homogeneous enough to provide a quality transparent electrode (resulting after drying the wet ink layer on the polymer substrate). For a quality transparent electrode, the sheet resistance of the dried ink layers at different points of the transparent electrode must not vary by more than 10%, based on the average value of the sheet resistances measured at different points on the same transparent electrode.

Example 3

A dispersion of surface modified silver nanowires having the surface agent compound 1-dodecanethiol attached to their surface in ethanol (concentration of said surface modified silver nanowires in ethanol: 0.5 wt.-%) is being mixed polyvinyl butyral (0.5 wt.-%, CAS number: 63148-65-2) having a weight average molecular weight in the range from 50,000 g/mol to 60,000 g/mol to give a silver ink composition. The concentration of surface modified silver nanowires and polyvinyl alcohol in the silver ink composition are shown in Table 3. The total weight of 1-dodecanethiol attached to the surface modified silver nanowires was 10 mg per g surface modified silver nanowires determined by TGA.

TABLE 3

| compound | surface modified silver nanowires | polyvinyl butyral |
| --- | --- | --- |
| concentration (wt.-%) | 0.5 | 0.5 |

The resulting silver ink composition is coated onto a polymer substrate by blade coating (coating speed: 5 cm/sec) so that a wet ink layer results on the polymer substrate. The thickness of the wet ink layer was 6 µm. The wet ink layer on the polymer substrate was dried at 130° C. for 5 minutes. The resulting dried ink layer had a transmission of 92.9%, a haze of 1.13% and a sheet resistance of 99Ω/sq.

As a reference, a wet reference ink layer has been prepared in the same way as described above with a dispersion comprising surface modified silver nanowires having PVP attached to their surface instead of 1-dodecanethiol.

Figure 10:
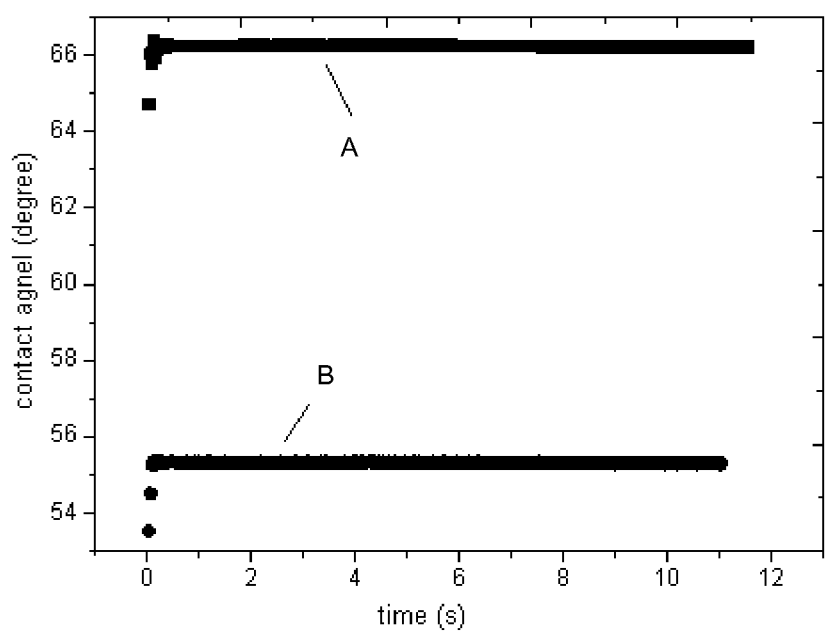
FIG. 10 A graph showing the contact angle of dried ink layers prepared in example 3.

The results of the contact angle measurements depicted in FIG. 10 are as follows:

Graph A: the contact angle of the wet ink reference layer comprising surface modified silver nanowires having PVP attached to their surface is 55° and

Graph B: the contact angle of the wet ink layer comprises surface modified silver nanowires having 1-dodecanethiol attached to their surface is 66°.

The larger contact angle of the wet ink layer comprising surface modified silver nanowires having 1-dodecanethiol attached to their surface indicates that said wet ink layer is more hydrophobic than the corresponding wet reference ink layers comprising surface modified silver nanowires having PVP attached to their surface.

As a consequence the wet ink layer comprising surface modified silver nanowires having 1-dodecanethiol attached to their surface does not smear over the surface of the hydrophilic surface of the polymer substrate and can thus be more precisely coated on the surface of the polymer substrate.

The results show that the surface modification with 1-dodecanethiol can enhance the hydrophobic properties of the coatings. Therefore, a better water-resistance of the coating can also be expected in a humid environment.

Experiment 4

A dispersion of surface modified silver nanowires having attached to their surface PEGT with a weight average molecular weight of 6000 g/mol (concentration of said surface modified silver nanowires in ethanol: 0.5 wt.-%) is being mixed with poly(methyl methacrylate) having a weight average molecular weight of 7000 g/mol (0.5 wt.-%) to give a silver ink composition. The concentration of surface modified silver nanowires and poly(methyl methacrylate) in the silver ink composition are shown in Table 4.

TABLE 4

| compound | surface modified silver nanowires | poly(methyl methacrylate) |
|---|---|---|
| concentration (wt.-%) | 0.5 | 0.5 |

The resulting silver ink composition is coated onto a polymer substrate by blade coating (coating speed: 5 cm/sec) so that a wet ink layer results on the polymer substrate. The thickness of the wet ink layer was 6 µm.

The wet ink layer on the polymer substrate was dried at 130° C. for 5 minutes. The resulting dried ink layer had a transmission of 92.2%, a haze of 0.70% and a sheet resistance of 65Ω/sq.

The above results show that the haze and sheet resistance of a dried silver ink layer comprising surface modified silver nanowires having attached to their surface PEGT with a weight average molecular weight of 6000 g/mol and poly(methyl methacrylate) and poly(methyl methacrylate) as a binder are similar compared to products comprising poly(ethylene glycol) methyl ether thiol and vinylchloride co- and acrylate polymers as binder.

Consequently, different binders can be used with product dispersions comprising surface modified silver nanowires having surface agent compounds with one or more functional groups selected from the group consisting of thiol and amine attached to their surface, to formulate a silver ink.

The skilled person is thus able to combine different constituents with a variety of product dispersions to give a product of the invention adjusted to the specific needs of the coating or printing method used for applying said product of the invention onto the surface of an article.

Example 5

The silver ink composition prepared in example 2.4 was applied on a substrate by screen printing (printing speed: 30 cm/s) to give a wet ink layer on the polymer substrate.

The screen printing is conducted on AT-HUF-701 from Alraun Technik GmbH at room temperature.

During the screen printing, the PEGT with a weight average molecular weight of 800 g/mol and PEGT with a weight average molecular weight of 6000 g/mol remained attached to the surface of said surface modified silver nanowires.

The wet ink layer on the polymer substrate was dried at 130° C. for 5 minutes to give a dried ink layer on the polymer substrate. The surface modified silver nanowires remained homogeneously dispersed in the wet ink layer on the polymer substrate until the wet ink layer was completely dried.

The resulting dried ink layer on the polymer substrate showed a transmission of 87.5%, a haze of 5.24% and a sheet resistance of 160Ω/sq.

Therefore, screen printing of a product of the invention on the surface of a substrate (as an example of a method of coating the surface of an article according to the invention) was successful and met the demands of industrial standards in view of the transmission, the haze and the sheet resistance of the resulting dried ink layer.

The invention claimed is:

1. A method of preparing a product comprising an amount of surface modified silver nanowires dispersed in a product dispersion medium, the method comprising
    (a) preparing or providing a first surface agent compound having one or more functional groups selected from the group consisting of thiol, for attaching the first surface agent compound to the surface of a silver nanowire, wherein said first surface agent compound comprises a poly(ethylene glycol) methyl ether thiol (PEGT),
    (b) preparing or providing an amount of silver nanowires which is dispersed in an intermediate dispersion medium, attaching a second surface agent compound different from the first surface agent compound to the surface of said silver nanowires,
    and/or
    the amount of silver nanowires is prepared using a polyol process and a second surface agent compound different from the first surface agent compound is attached to the surface of said silver nanowires,
    (c) attaching said first surface agent compound to the surface of said silver nanowires to obtain the surface modified silver nanowires,
    after (b) and before, in or after (c), said intermediate dispersion medium is partially or completely exchanged against an additive dispersion medium which is different from the intermediate dispersion medium, and
    said additive dispersion medium comprises one or more compounds selected from the group consisting of a substituted or an unsubstituted, a branched or a linear, and an aliphatic or an aromatic organic compound having a total number of carbon atoms of at least 4 and optionally
- (d) adding one or more further constituents and/or conducting one or more further steps to obtain said product.

2. The method according to claim 1, wherein the product dispersion medium consists of an additive dispersion medium or a mixture of an additive dispersion medium and an intermediate dispersion medium.

3. The method according to claim 1, wherein in (c) said second surface agent compound is partially or completely removed from the surface of said silver nanowires prepared or provided in (b).

4. The method according to claim 1, wherein
in (b)
and
in one or more further steps after (c) said intermediate dispersion medium is partially or completely exchanged against an additive dispersion medium which is different from the intermediate dispersion medium.

5. The method according to claim 1, wherein
in (b) the amount of silver nanowires is dispersed in the intermediate dispersion medium in a concentration of from 0.001 wt.-% to 2 wt.-%, based on a total amount of the intermediate dispersion, and the intermediate dispersion has a homogeneity index of at least 80%,
and/or
said product is a product dispersion which comprises an amount of the surface modified silver nanowires dispersed in the product dispersion medium in a concentration of from 0.001 wt.-% to 2 wt.-%, based on a total amount of the product dispersion and the product dispersion has a homogeneity index of at least 80%.

6. The method according to claim 1, wherein said intermediate dispersion medium and/or said additive dispersion medium has a boiling point >30° C. at 1013 hPa.

7. The method according to claim 1, wherein
a ratio of a total weight of surface agent compounds attached to the surface of said surface modified silver nanowires to a total weight of said surface modified silver nanowires is in the range of from 0.01 to 0.3 and is determined by thermogravimetry.

8. The method according to claim 1, wherein said first surface agent compound has a weight average molecular weight of from 500 to 500 000 g/mol.

9. The method according to claim 1, wherein the product dispersion medium comprises one or more compounds selected from the group consisting of water, ethanol, 2-propanol, dipropylene glycol methyl ether acetate, butyl acetate and THF.

10. The method according to claim 1, wherein the intermediate dispersion medium comprises one or more compounds selected from the group consisting of water, acetone, methanol, ethanol, propan-1-ol, propan-2-ol, 1-hydroxybutane, 2-hydroxybutane, 1-hydroxy-2-methylpropane, 2-hydroxy-2-methylpropane, formic acid, acetic acid, propionic acid and aniline.

11. The method according to claim 1, wherein the additive dispersion medium comprises one or more compounds selected from the group consisting of 1-hydroxypentane, 2-hydroxypentane, 1-hydroxy-2-methylpentane, 2-hydroxy-2-methylpentane, diethyl ether, tetrahydrofuran, diisopropyl ether, dipropylene glycol methyl ether acetate, ethyl acetate, butyl acetate, ethyl lactate, butyl hydroxyacetate, 2-butanone, 2-pentanone, 2-hexanone isophorone and an aromatic hydrocarbon.

* * * * *